United States Patent
Ito

(10) Patent No.: US 11,327,621 B2
(45) Date of Patent: May 10, 2022

(54) TRANSPARENT CONDUCTIVE MULTILAYER BODY AND TOUCH PANEL MADE OF THE SAME

(75) Inventor: Haruhiko Ito, Hino (JP)

(73) Assignee: TEIJIN LIMITED, Osaka (JP)

(*) Notice: Subject to any disclaimer, the term of this patent is extended or adjusted under 35 U.S.C. 154(b) by 1339 days.

(21) Appl. No.: 12/523,276

(22) PCT Filed: Jan. 15, 2008

(86) PCT No.: PCT/JP2008/050662
§ 371 (c)(1),
(2), (4) Date: Jul. 15, 2009

(87) PCT Pub. No.: WO2008/088059
PCT Pub. Date: Jul. 24, 2008

(65) Prior Publication Data
US 2009/0315849 A1  Dec. 24, 2009

(30) Foreign Application Priority Data

Jan. 16, 2007 (JP) ............................. JP2007-006928
Oct. 26, 2007 (JP) ............................. JP2007-278482

(51) Int. Cl.
| | | |
|---|---|---|
| *B32B 27/18* | (2006.01) | |
| *H01B 5/14* | (2006.01) | |
| *G06F 3/045* | (2006.01) | |
| *C08J 7/04* | (2020.01) | |
| *C08J 7/043* | (2020.01) | |
| *C08J 7/044* | (2020.01) | |
| *C08J 7/046* | (2020.01) | |

(52) U.S. Cl.
CPC .............. *G06F 3/045* (2013.01); *C08J 7/043* (2020.01); *C08J 7/044* (2020.01); *C08J 7/046* (2020.01); *C08J 7/0423* (2020.01)

(58) Field of Classification Search
CPC .......................... G02B 1/116; H01L 31/02165
See application file for complete search history.

(56) References Cited

U.S. PATENT DOCUMENTS

| | | | | |
|---|---|---|---|---|
| 6,416,818 B1 * | 7/2002 | Aikens | ................... | B82Y 30/00 427/383.1 |
| 2004/0114532 A1 | 6/2004 | Naka et al. | | |
| 2004/0151895 A1 | 8/2004 | Itoh et al. | | |
| 2004/0265602 A1 | 12/2004 | Kobayashi et al. | | |
| 2005/0227092 A1 * | 10/2005 | Yamaya | ............... | C09D 5/1625 428/447 |
| 2007/0224412 A1 * | 9/2007 | Hara | ........................ | B32B 17/06 428/336 |
| 2009/0002323 A1 | 1/2009 | Shiroishi et al. | | |

FOREIGN PATENT DOCUMENTS

| | | | | |
|---|---|---|---|---|
| EP | 1691375 A1 | 8/2006 | | |
| EP | 1 787 795 A1 | 5/2007 | | |
| JP | 61-146526 A | 7/1986 | | |
| JP | 2-66809 A | 3/1990 | | |
| JP | 2-129808 A | 5/1990 | | |
| JP | 7-219697 A | 8/1995 | | |
| JP | 07219697 A * | 8/1995 | | |
| JP | 8-192492 A | 7/1996 | | |
| JP | 2005-014572 A | 1/2005 | | |
| JP | 2005-104141 A | 4/2005 | | |
| JP | 2005-116515 A | 4/2005 | | |
| JP | 2005-182737 A | 7/2005 | | |
| JP | WO 2006019184 A1 * | 2/2006 | ............. | B32B 17/06 |
| JP | 2006-056136 A | 3/2006 | | |
| JP | 2006-244771 A | 9/2006 | | |
| JP | 2006-252875 A | 9/2006 | | |
| KR | 10-2006-0123202 A | 12/2006 | | |
| WO | 03/020509 A1 | 3/2003 | | |
| WO | WO 2005036565 A1 * | 4/2005 | | |
| WO | 2005/073763 A1 | 8/2005 | | |
| WO | WO 2005073763 A1 * | 8/2005 | | |

* cited by examiner

*Primary Examiner* — Sheeba Ahmed
(74) *Attorney, Agent, or Firm* — Sughrue Mion, PLLC

(57) ABSTRACT

A transparent conductive multilayer body includes a cured resin layer, a first transparent conductive layer, and a second transparent conductive layer sequentially laminated on at least one surface of a polymer film. The first transparent conductive layer is a crystalline transparent conductive layer free of an organic component. The second transparent conductive layer contains alkoxysilane, and at least one kind of fine particles A formed of conductive fine particles of metal oxide or metal having an average primary particle diameter of 100 nm or less.

6 Claims, 6 Drawing Sheets

TRANSPARENT CONDUCTIVE MULTILAYER BODY AND TOUCH PANEL MADE OF THE SAME

CROSS REFERENCE TO RELATED APPLICATION

This application is a National Stage of International Application No. PCT/2008/050662 filed Jan. 15, 2008, claiming priority based on Japanese Patent Application No. 2007-006928, filed Jan. 16, 2007, and based on Japanese Patent Application No. 2007-278482, filed Oct. 26, 2007, the contents of all of which are incorporated herein by reference in their entirety.

TECHNICAL FIELD

The present invention relates to a transparent conductive multilayer body that includes a cured resin layer, a first transparent conductive layer, and a second transparent conductive layer sequentially laminated on at least one surface of a polymer film.

BACKGROUND ART

There has been a widespread use of portable information terminals equipped with a display device (display) and a transparent touch panel (input device). The common transparent touch panel of a resistive-film type is configured to include two transparent electrode substrates, which are disposed about 10 µm to 100 µm distant apart with their transparent conductive layers facing each other. The surfaces of the transparent conductive layers come into contact with each other only at a portion of applied external force, thereby operating as a switch to allow a user to, for example, select a menu on the display screen, or enter graphics and characters.

In recent years, there has been movement toward narrower frames in a liquid crystal display or other types of displays, and therefore in transparent touch panels. The narrow frames have created a demand for higher edge pressure durability—write durability at the edge portions of the transparent touch panel—in addition to the write durability conventionally required for the transparent touch panel.

To improve write durability required for the transparent touch panel, Patent Documents 1 to 3 propose transparent conductive multilayer bodies in which two transparent polymer film base materials are laminated with an adhesive or a transparent resin layer of a specific hardness (or Young's modulus) in between. While the methods described in these publications are known to improve write durability, the lamination of the two transparent polymer films via an adhesive or a transparent resin layer complicates the production steps, and accordingly production efficiency is poor. Another problem is that, because the transparent conductive multilayer body is structurally weak in rigidity, it bends when used for a large transparent touch panel exceeding 10 inches in screen size.

Further, Patent Document 4 proposes a touch panel of a resistive-film type that can be produced with reduced costs and enables mass production, in which at least one of the transparent electrode layers is made from a transparent conductive polymer such as a thiophene conductive polymer or a polyaniline conductive polymer. The publication also proposes a multilayer body including an ITO (indium tin oxide) layer and a transparent conductive polymer layer. However, a transparent conductive multilayer body using conductive polymer material for the transparent electrodes is problematic in that a large contact resistance generates when the oppositely disposed transparent conductive layers forming the transparent touch panel come into contact with each other, preventing the operation of the transparent touch panel. Another problem is that transmittance and environmental reliability cannot be ensured.

Patent Document 5 proposes a touch panel in which a polymer layer containing conductive fine particles is formed on a transparent electrode surface of a transparent substrate. Patent Document 6 proposes forming a thin conductive layer of metal and/or metal oxide using a vacuum deposition method, an ion plating method, or a sputtering method, and laminating a conductive coating. However, because the transparent touch panel using the transparent conductive multilayer bodies proposed in Patent Documents 4, 5, and 6 does not include a cured resin layer between the transparent conductive layer and the polymer film, the oligomer component separates out from the polymer film after a process such as a heat treatment, when the polymer film uses polyethylene terephthalate commonly used for the movable electrode substrate of the transparent touch panel. Further, because the properties of the transparent conductive layer (film properties) are not specified, the write durability required for the transparent touch panel cannot be provided when the transparent conductive multilayer body is used for the transparent touch panel.

[Patent Document 1] JP-A-2-66809
[Patent Document 2] JP-A-2-129808
[Patent Document 3] JP-A-8-192492
[Patent Document 4] JP-A-2005-182737
[Patent Document 5] JP-A-7-219697
[Patent Document 6] JP-B-3-48605

DISCLOSURE OF THE INVENTION

It is an object of the present invention to provide a transparent touch panel having improvements in both write durability conventionally required for the transparent touch panel, and write durability (edge pressure durability) at the edge portions of the transparent touch panel. The invention also provides a transparent conductive multilayer body suitable for such a transparent touch panel.

BEST MODE FOR CARRYING OUT THE INVENTION

Figure 1:
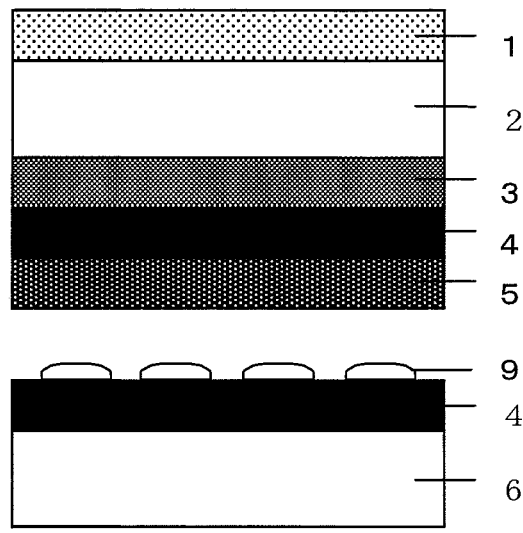
FIG. 1 is a cross sectional view schematically illustrating a configuration of a transparent touch panel obtained according to the procedures of Examples 1 and 7, and Comparative Examples 3 and 4 of the present application.

The following will describe an embodiment of the present invention in detail. It should be noted that the descriptions of the embodiment and examples below are given merely for illustrative purposes, and do not limit the scope of the present invention in any ways.
Polymer Film A transparent conductive multilayer body of the present invention includes a cured resin layer, a first transparent conductive layer, and a second transparent conductive layer sequentially laminated on at least one surface of a polymer film.

The organic polymer that forms the polymer film is not particularly limited, as long as it is a transparent organic polymer that excels in heat resistance. Examples of the organic polymer include: polyester resins such as polyethylene terephthalate, polyethylene-2,6-naphthalate, and polydiallyl phthalate; polycarbonate resins; polyether sulfone resins; polysulfone resins; polyallylate resins; acrylic resins; cellulose acetate resins; and cycloolefin polymers. These may be used in the form of a homopolymer or a copolymer. Further, these organic polymers may be used either individually or as a blend.

The polymer film can be suitably formed by ordinary methods such as a melt extrusion method or a flow casting method. Preferably, the polymer film formed may be subjected to uniaxial drawing or biaxial drawing as required to improve its mechanical strength or optical functions.

When using a transparent conductive multilayer body of the present invention as the movable electrode substrate of a transparent touch panel, the polymer film should preferably have a thickness of 75 to 400 µm, in order to provide strength sufficient to maintain the flexibility and flatness required for the operation of the transparent touch panel as a switch. When the intended use is a fixed electrode substrate, the polymer film should preferably be a sheet with a thickness of 0.4 to 4.0 mm, in order to provide strength sufficient to maintain flatness. Alternatively, the polymer film may be configured to have a total thickness of 0.4 to 4.0 mm by being provided as a 50- to 400-µm thick film combined with another plastic sheet.

When a transparent conductive multilayer body of the present invention is used as the movable electrode substrate of a transparent touch panel, the fixed electrode substrate may be realized by forming a transparent conductive layer on the plastic sheet or a glass substrate, or a multilayer body of the polymer film and a glass substrate, or a multilayer body of the polymer film and a plastic sheet. From the standpoint of the strength and the weight of the transparent touch panel, the single-layer or multilayer fixed electrode substrate should preferably have a thickness of 0.1 to 4.0 mm.

Over the last years, a new type of a transparent touch panel has been developed in which a polarizing plate or a combination of a polarizing plate and a retardation film is laminated on the input side (user side) of the transparent touch panel. A main advantage of this configuration in that, by the optical effect of the polarizing plate or a combination of the polarizing plate and the retardation film, the reflectivity of external light in the transparent touch panel can be reduced at least in half, and the contrast of the display can be improved with the transparent touch panel in place.

In this type of transparent touch panel, because polarized light passes through the transparent conductive multilayer body, it is preferable to use a polymer film that excels in optical isotropy. Specifically, it is preferable that in-plane retardation value Re, represented by $Re=(n_x-n_y)\times d(nm)$, be at least 30 nm or less, more preferably 20 nm or less, where $n_x$ is the refractive index along the slow axis of the film, $n_y$ is the refractive index along the fast axis of the film, and d (nm) is the film thickness. Here, the in-plane retardation value of the substrate is a representative value of the measurement taken at the wavelength of 590 nm using a spectroscopic ellipsometer (M-150, JASCO Corporation).

The in-plane retardation value of the transparent electrode substrate is highly important in application of the transparent conductive multilayer body for the transparent touch panel of the polarized light transmissive type as exemplified above. In addition, in order to improve the viewing angle characteristics of the transparent touch panel, it is preferable that the three-dimensional refractive index characteristics of the transparent electrode substrate, represented by K value of the formula $K=\{(n_x+n_y)/2-n_z\}\times d$, be fall in a range of from −250 to +150 nm, more preferably from −200 to +100 nm, where $n_z$ is the refractive index along the thickness direction of the substrate.

The polymer film that excels in optical isotropy may be, for example, a molded substrate made from materials such as polycarbonate, amorphous polyallylate, polyether sulfone, polysulfone, triacetyl cellulose, diacetyl cellulose, a cycloolefin polymer, modified forms thereof, and copolymers of these with other materials; a molded substrate of a heat curable resin such as epoxy resin; or a molded substrate of an ionizing radiation curable resin such as acrylic resin. From the standpoint of considerations such as moldability, manufacturing cost, and heat stability, it is most preferable to use a molded substrate made from materials such as polycarbonate, amorphous polyallylate, polyether sulfone, polysulfone, a cycloolefin polymer, modified forms thereof, and copolymers of these with other materials.

More specifically, in the case of polycarbonate, the molded substrate is preferably made of a polymer or a copolymer including a monomer unit of at least one component selected from bisphenol A, 1,1-di(4-phenol)cyclohexylidene, 3,3,5-trimethyl-1,1-di(4-phenol)cyclohexylidene, fluorene-9,9-di(4-phenol), fluorene-9, and 9-di(3-methyl-4-phenol). It is also preferable to use a polycarbonate made of a mixture of a polymer or a copolymer including a monomer unit of at least one component selected from the foregoing group, and that has an average molecular weight of about 15,000 to 100,000 (commercially available from Teijin Chemicals Ltd. under the trade names "Panlite" and "Pureace", and from Bayer under the trade name "Apec HT" for example).

In the case of amorphous polyallylate, a molded substrate made from a commercially available product, such as "Elmec" (Kaneka), "U Polymer" (Unitika), or "Isalyl" (Isonova), can be used.

In the case of a cycloolefin polymer, a molded substrate made from a commercially available product, such as "Zeonor" (Zeon Corporation) or "Arton" (JSR), can be used.

The polymer materials exemplified above can be molded by a method such as a melt extrusion method, a flow casting method, or an injection molding method. From the standpoint of obtaining excellent optical isotropy, it is preferable to use a flow casting method or a melt extrusion method for molding.

First Transparent Conductive Layer

A first transparent conductive layer of the present invention is a crystalline conductive layer that is free of an organic component. Examples include a crystalline metal layer, or a crystalline metal compound layer.

As used herein, the phrase "free of an organic component" means that the organic component content is less than 0.5 weight %. Examples of the layer component used to form the first transparent conductive layer include metal oxides such as silicon oxide, aluminum oxide, titanium oxide, magnesium oxide, zinc oxide, indium oxide, and tin oxide. Among these, a metal oxide layer of indium oxide and/or tin oxide is particularly preferable.

Further, the first transparent conductive layer is preferably a crystalline layer whose primary component is indium oxide, particularly preferably a crystalline ITO layer. The tin oxide content of ITO is preferably 2 wt % or more and 20 wt % or less, more preferably 2 wt % or more and 15 wt % or less. The crystal grain size is preferably 3,000 nm or less, although the upper limit is not particularly required. A crystal grain size above 3,000 nm is not preferable because it impairs write durability. As used herein, "crystal grain size" is the longest diagonal line or the largest diameter observed in each polygonal or elliptic region under a transmission electron microscope (TEM).

In the present invention, "the indium oxide as a primary component" refers to indium oxides that contain elements such as tin, tellurium, cadmium, molybdenum, tungsten, fluorine, and zinc as a dopant, or indium oxides that contain tin and other additional elements such as silicon, titanium, and zinc as a dopant.

Further, as used herein, the "crystalline conductive layer" refers to layers in which the crystal phase accounts for at least 50%, preferably at least 75%, more preferably at least 95%, and particularly preferably almost 100% of the dopant-containing indium oxide layer.

The first transparent conductive layer, a crystalline conductive layer, has better adhesion with other layers such as the substrate polymer film, the cured resin layer, and the metal oxide layer, and better environmental reliability than other transparent conductive layers such as, for example, an amorphous layer. Thus, when a transparent conductive multilayer body of the present invention is used for a touch panel, the required qualities of the touch panel, including environmental reliability, write durability, and edge pressure durability, can be significantly improved.

Further, with the transparent conductive layer formed by a crystalline conductive layer, it is possible to improve optical properties, particularly light transmittance, hue (b* value), and coloration, compared with a transparent conductive layer formed by an amorphous conductive layer.

The first transparent conductive layer can be formed by known methods, including physical methods (physical vapor deposition; hereinafter, "PVD"), for example, such as a DC magnetron sputtering method, an RF magnetron sputtering method, an ion plating method, a vacuum deposition method, and a pulsed laser deposition method. Considering industrial productivity concerning formation of a metal compound layer of a uniform thickness over a large area, a DC magnetron sputtering method is preferable. Other than the physical methods (PVD), chemical methods such as chemical vapor deposition (hereinafter, "CVD") and a sol-gel method may be used. From the standpoint of thickness control, a sputtering method is preferable.

Preferably, the first transparent conductive layer has a thickness of from 5 to 50 nm, more preferably 5 to 30 nm, in view of transparency and conductivity. A thickness of the first transparent conductive layer below 5 nm is not preferable, because it tends to degrade time-dependent resistance stability, and environmental reliability. A thickness of the first transparent conductive layer above 50 nm is not preferable for touch panel application because it lowers surface resistivity. Further, a thickness of the first transparent conductive layer above 30 nm is not preferable, because, compared with a transparent conductive layer of 30 nm or less, flexural characteristics tend to degrade, and it becomes difficult to ensure edge pressure durability required for the touch panel.

When using a transparent conductive multilayer body of the present invention for a transparent touch panel, it is preferable, from the standpoint of reducing power consumption, meeting circuit process requirements and so on, that the first transparent conductive layer have a surface resistivity of from 100 to 2,000Ω/□ (Ω/sq.), more preferably from 140 to 1,000Ω/□ (Ω/sq.), when it has a thickness of 10 to 30 nm.

Second Transparent Conductive Layer

A second transparent conductive layer of the present invention includes alkoxysilane, and at least one kind of fine particles A formed of conductive fine particles of metal oxide or metal having an average primary particle diameter of 100 nm or less.

The content of fine particles A in the second transparent conductive layer is preferably 0.1 parts by weight or more and 400 parts by weight or less with respect to 100 parts by weight of alkoxysilane. More preferably, the content of fine particles A is 0.5 parts by weight or more and 200 parts by weight or less, further preferably 0.5 parts by weight or more and 100 parts by weight or less. When the content of fine particles A is less than 0.1 parts by weight with respect to 100 parts by weight of alkoxysilane, there will be an excessively large contact resistance when the surfaces of the oppositely disposed transparent conductive layers of the transparent touch panel are brought into contact with each other, making it difficult to operate the transparent touch panel. A content of fine particles A less than 0.5 parts by weight is not preferable, because it may generate remainders of disused parts and cause etching failure in the etching step in which the transparent conductive layer is patterned with an acid.

When the content of fine particles A is in excess of 400 parts by weight with respect to 100 parts by weight of alkoxysilane, it becomes difficult to ensure sufficient strength for the second transparent conductive layer, making it difficult to provide write durability or other properties required for the transparent touch panel.

The thickness of the second transparent conductive layer is preferably from 10 nm to 1,500 nm, more preferably 50 nm to 1,000 nm, and further preferably 100 nm to 1,000 nm, all inclusive. A thickness below 10 nm makes it difficult to improve edge pressure durability when a transparent conductive multilayer body of the present invention is used as the transparent conductive layer of a touch panel. When the thickness exceeds 1,500 nm, there will be an excessively large contact resistance when the oppositely disposed transparent conductive layers of the transparent touch panel are brought into contact with each other, making it difficult to operate the transparent touch panel.

Alkoxysilane

Examples of the alkoxysilane usable for the second transparent conductive layer includes tetramethoxysilane, tetraethoxysilane, methyltrimethoxysilane, methyltriethoxysilane, dimethyldimethoxysilane, γ-glycidoxypropyl trimethoxysilane, β-(3,4-epoxy cyclohexyl)ethyltrimethoxysilane, vinyltrimethoxysilane, N-β(aminoethyl)γ-aminopropyl trimethoxysilane, N-β(aminoethyl)γ-aminopropyl dimethoxysilane, and γ-aminopropyl triethoxysilane.

From the standpoint of considerations such as the mechanical strength, adhesion, and solvent resistance of the layer, it is preferable that the alkoxysilanes exemplified above be used in a combination of two or more. Particularly, from the standpoint of solvent resistance, it is preferable that an alkoxysilane having an amino group within the molecule be included at a weight ratio of 0.5% to 40% with respect to the total alkoxysilane composition.

The alkoxysilane may be used either as amonomer, or after being turned into an appropriate oligomer by hydrolysis and dehydrocondensation. Generally, a coating solution prepared by dissolving the alkoxysilane in a suitable organic solvent and diluting the solution is coated on the first transparent conductive layer. The coating layer formed on the first transparent conductive layer undergoes hydrolysis with the moisture or other substances in air, and crosslinking proceeds by dehydrocondensation.

Generally, an appropriate heat treatment is needed to promote crosslinking, and it is preferable in the coating step to perform a heat treatment at a temperature of 100° C. or more for at least several minutes. Depending on situations, the heat treatment may accompany irradiation of the coating layer with active rays such as ultraviolet light. In this way, the degree of crosslinking can be improved.

As the organic solvent, alcohol solvents and hydrocarbon solvents are preferable. Examples include ethanol, isopropylalcohol, butanol, 1-methoxy-2-propanol, hexane, cyclohexane, and ligroin. Polar solvents such as xylene, toluene, cyclohexanone, methyl isobutyl ketone, and isobutyl acetate can be used as well. These solvents may be used either individually or as a mixed solvent of two or more.

For coating, methods using known coating machines such as a doctor knife, a bar coater, a gravure roll coater, a curtain coater, a knife coater, and a spin coater are used. Methods such as a spray method and an immersion method can also be used.

Instead of alkoxysilane, materials such as a radiation curable resin may be combined with fine particles A to form the second transparent conductive layer. However, when a radiation curable resin is used, because the second transparent conductive layer is thin, oxygen inhibition occurs and the radiation curable resin cannot be cured sufficiently. This leads to the degradation of slide durability in a touch panel that uses a transparent conductive multilayer body incorporating a radiation curable resin.

Further, a curable resin other than alkoxysilane may be combined with fine particles A. However, when a curable resin other than alkoxysilane is used, it becomes difficult to ensure adhesion for the first transparent conductive layer. This also degrades slide durability in a touch panel that uses a transparent conductive multilayer body incorporating a curable resin other than alkoxysilane.

It is also possible to use plastic resin with fine particles A. However, because of insufficient chemical resistance, the plastic resin causes problems during production of the touch panel.

Fine Particles A

A second transparent conductive layer of the present invention must include, as components, alkoxysilane, and at least one kind of fine particles A formed of conductive fine particles of metal oxide or metal having an average primary particle diameter of 100 nm or less.

In the case of metal oxide, fine particles A may be, for example, indium oxide, tin dioxide, zinc oxide, cadmium oxide, cadmium-indium oxide ($Cd/In_2O_4$), cadmium tin oxide ($Cd_2SnO_4$), zinc tin oxide ($Zn_2SnO_4$), or indium oxide. Among these metal oxides, indium oxide and/or tin oxide are particularly preferable.

When metal oxide fine particles of indium oxide and/or tin oxide are used as the fine particles A contained in the second transparent conductive layer, superior environmental reliability can be obtained compared with other metal oxide fine particles. Crystalline ITO fine particles are particularly superior in this regard. Preferably, the tin oxide content of the ITO fine particles is at least 2 wt % and 20 wt % or less, more preferably at least 2 wt % and 15 wt % or less.

When fine particles A are metal fine particles, the metal fine particles are not particularly limited as long as metallic particles of metal and/or alloy are used. Whether to use fine particles of metal or alloy can be suitably selected according to intended use.

The metal used for the metal fine particles is not particularly limited, and can be suitably selected according to intended use. The metal fine particles may be metal itself, or may be other forms such as metal chalcogenides or metal halogen compounds. Examples of the metal include Ti, Fe, Co, Ni, Zr, Mo, Ru, Rh, Ag, Cd, Sn, Ir, Pt, Au, Pb, Bi, and an alloy of these metals.

The alloy is not particularly limited, and can be selected according to intended use. For example, the alloy may be a combination of the metals exemplified above, and an element selected from Sc, Y, Ti, Zr, V, Nb, Fe, Co, Ni, Ru, Rh, Pd, Os, Ir, the lanthanoids, and the actinoids.

The average primary particle diameter of fine particles A must be 100 nm or less, preferably 75 nm or less, more preferably 50 nm. When the average primary particle diameter of fine particles A is in excess of 100 nm, the resulting transparent conductive layer turns white in color, and the transparency of the transparent touch panel is lost.

Fine Particles B

When the surfaces of the oppositely disposed transparent conductive layers of the transparent touch panel are substantially flat, there are cases where the surfaces of the transparent conductive layers stick together upon contact. This degrades the transparent conductive layers, causing malfunction in the transparent touch panel. Such sticking between the surfaces of the transparent conductive layers can be prevented by including fine particles B in the second transparent conductive layer.

Further, fine particles B may be included in the second transparent conductive layer for the purpose of improving surface slidability of the transparent conductive layers, even when the surfaces of these layers are not substantially flat.

Preferably, the average primary particle diameter of fine particles B is at least 1.2 times the reference thickness of the second transparent conductive layer. When the average primary particle diameter of fine particles B is less than 1.2 times the thickness of the second transparent conductive layer, it becomes difficult to roughen the surface of the second transparent conductive layer, making it difficult to prevent sticking between the surfaces of the transparent conductive layers forming the transparent touch panel.

It is preferable that the average primary particle diameter of fine particles B be at most 1.5 times the reference thickness of the second transparent conductive layer, although the upper limit is not particularly limited. When the average primary particle diameter of fine particles B is more than 1.5 times the reference thickness of the second transparent conductive layer, fine particles B easily detach themselves from the second transparent conductive layer, making it difficult to ensure reliability, such as slide durability, required for the touch panel. Further, when the average primary particle diameter of fine particles B is more than 1.5 times the reference thickness of the second transparent conductive layer, the image quality of the display using the touch panel may be undesirably impaired (by flickers).

The content of fine particles B in the second transparent conductive layer is preferably 2.5 parts by weight or less, more preferably 1.5 parts by weight or less, with respect to the total 100 parts by weight of the alkoxysilane component and the fine particles A forming the second transparent conductive layer. When the content of fine particles B is 2.5 parts by weight or less, a desirable transparent conductive layer with reduced cloudiness can be provided without losing the effect of preventing the malfunction of the transparent touch panel caused by sticking between the surfaces of the oppositely disposed transparent conductive layers of the transparent touch panel. When fine particles B are contained in excess in the transparent conductive layer, fine particles B easily detach themselves from the transparent conductive layer, and the adhesion for the first transparent conductive layer becomes weak. This may impair reliability for the write durability required for the transparent touch panel.

The components of fine particles B are not particularly limited, and can be suitably selected as long as the average primary particle diameter falls within the foregoing range. For example, inorganic compounds, organic compounds, metal oxides, and metal fine particles can be used.

Preferably, fine particles B are conductive fine particles of metal oxide or metal. This makes it possible to prevent not only sticking between the surfaces of the oppositely disposed transparent conductive layers forming the transparent touch panel, but degradation of contact resistance that occurs when the surfaces of the transparent conductive layers are brought into contact with each other. In this case, in order to provide desirable conductivity for the second transparent conductive layer, the average primary particle diameter of fine particles B must be distinctively larger than the average primary particle diameter, 100 nm or less, of the fine particles A in the blend.

In the case of conductive metal oxide, fine particles B may be, for example, fine particles of metal oxides such as silicon oxide, aluminum oxide, titanium oxide, magnesium oxide, zinc oxide, indium oxide, and tin oxide. Among these, metal oxide fine particles of indium oxide and/or tin oxide are particularly preferable.

When fine particles B are metal fine particles, it is preferable to use metals such as, for example, Ti, Fe, Co, Ni, Zr, Mo, Ru, Rh, Ag, Cd, Sn, Ir, Pt, Au, Pb, and Bi, or an alloy of these metals.

Metal Oxide Layer

A transparent conductive multilayer body of the present invention may further include a metal oxide layer having a thickness of at least 0.5 nm and less than 5.0 nm between the polymer film and the first transparent conductive layer.

By sequentially laminating the polymer film, the metal oxide layer of a controlled thickness, and the first transparent conductive layer, the adhesion between these layers can be greatly improved. A transparent touch panel using such a transparent conductive multilayer body can further improve the write durability currently required for the transparent touch panel, compared with an arrangement not using the metal oxide layer. When the thickness of the metal oxide layer is 5.0 nm or more, the metal oxide layer starts showing its mechanical properties as a continuum, and the edge pressure durability required for the transparent touch panel cannot be improved. On the other hand, when the thickness is below 0.5 nm, thickness control becomes difficult, and sufficient adhesion cannot be easily provided between the polymer film and the first transparent conductive layer. In this case, the write durability required for the transparent touch panel may not be improved sufficiently.

Examples of the component usable for the metal oxide layer include metal oxides such as silicon oxide, aluminum oxide, titanium oxide, magnesium oxide, zinc oxide, indium oxide, and tin oxide.

These metal oxide layers can be formed by known methods including physical methods (physical vapor deposition; hereinafter, "PVD") such as a DC magnetron sputtering method, an RF magnetron sputtering method, an ion plating method, a vacuum deposition method, and a pulsed laser deposition method. Considering industrial productivity concerning formation of a metal oxide layer of a uniform thickness over a large area, a DC magnetron sputtering method is preferable. Other than the physical methods (PVD), chemical methods such as chemical vapor deposition (hereinafter, "CVD") and a sol-gel method may be used. From the standpoint of thickness control, a sputtering method is preferable.

The target of sputtering is preferably a metal target, and a reactivity sputtering method is widely used. This is because the oxides of the elements used for the metal oxide layer are often insulators, and the DC magnetron sputtering method cannot accommodate a metal compound target. Over the last years, a power supply has been developed that causes two cathodes to simultaneously discharge, and prevents formation of insulators on the target. With this power supply, it is possible to use a pseudo-RF magnetron sputtering method.

In the present invention, when forming the metal oxide layer with a metal target using a DC magnetron sputtering method, the metal oxide layer can be produced by a method in which the pressure (back pressure) inside the vacuum tank used to form the metal oxide layer is temporarily set to $1.3 \times 10^{-4}$ Pa or less, before introducing an inert gas and oxygen. The pressure inside the vacuum tank used to form the metal oxide layer is temporarily set to $1.3 \times 10^{-4}$ Pa or less, because it desirably reduces the influence of molecular species that remain in the vacuum vessel and have the risk of adversely affecting the formation of the metal oxide layer. The pressure inside the vacuum tank is more preferably $5 \times 10^{-5}$ Pa or less, further preferably $2 \times 10^{-5}$ Pa or less.

The inert gas introduced into the vacuum tank may be, for example, He, Ne, Ar, Kr, or Xe. It is believed that the inert gas with larger atomic weights causes less damage to the metal oxide layer formed, and improves surface flatness. However, considering cost, Ar is preferable. In order to adjust the concentration of the oxygen incorporated in the layer, oxygen may be added to the inert gas in the $1.3 \times 10^{-3}$ to $7 \times 10^{-2}$ Pa range in terms of a partial pressure. Other than oxygen, $O_3$, $N_2$, $N_2O$, $H_2O$, $NH_3$, or the like may be used according to intended use.

Further, in the present invention, the metal oxide layer can be produced by a method in which the partial pressure of water in the vacuum vessel used to form the metal oxide layer is set to $1.3 \times 10^{-4}$ Pa or less, before introducing an inert gas and oxygen. The partial pressure of water may be controlled to more preferably $4 \times 10^{-5}$ Pa or less, further preferably $2 \times 10^{-5}$ Pa or less. For the purpose of incorporating hydrogen in the metal oxide layer to relieve the stress inside the metal oxide layer, water may be intentionally introduced in a range of $1.3 \times 10^{-4}$ to $3 \times 10^{-2}$ Pa. The adjustment may be made by introducing water using a variable leak valve or a mass flow controller, after creating a vacuum.

It is also possible to make adjustments by controlling the back pressure of the vacuum vessel.

In the present invention, a differential pumping in-process monitor may be used to determine the partial pressure of water. Further, it is also possible to use a quadruple mass spectrometer, which has a wide dynamic range, and enables measurement even under the pressure of the 0.1 Pa range. Generally, water is responsible for the pressure at a degree of vacuum of about $1.3 \times 10^{-5}$ Pa. As such, the measured value of a vacuum gage can be regarded as the partial pressure of water.

Because the polymer film is used as the substrate in the present invention, the substrate temperature of forming the metal oxide layer cannot be increased more than the softening point of the polymer film. Accordingly, in order to form the metal oxide layer, the substrate temperature must be from room temperature (or slightly below room temperature) to the softening point of the polymer film.

In the case where polyethylene terephthalate, a representative polymer film, is used, it is preferable to form the metal oxide layer at a maintained substrate temperature of 80° C. or less, unless any special treatment is performed. The substrate temperature is more preferably 50° C. or less, and further preferably 20° C. or less. Further, from the standpoint of controlling the out-gas from the polymer film substrate, it is preferable to form the metal oxide layer at a substrate temperature of 80° C. or less, more preferably 50° C. or less, and further preferably 20° C. or less, even when the metal oxide layer is formed on the polymer film substrate.

Cured Resin Layer

A transparent conductive multilayer body of the present invention must include a cured resin layer between the polymer film and the first transparent conductive layer, or between the polymer film and the metal oxide layer.

A curable resin used for the cured resin layer may be, for example, an ionizing radiation curable resin or a heat curable resin.

Examples of the constituent monomer of the ionizing radiation curable resin include monofunctional and multifunctional acrylates such as polyol acrylate, polyester acrylate, urethane acrylate, epoxy acrylate, modified-styrene acrylate, melamine acrylate, and silicon-containing acrylate.

Specific examples of the monomer include multifunctional monomers such as trimethylolpropane trimethacrylate, trimethylolpropane ethylene oxide-modified acrylate, trimethylolpropane propylene oxide-modified acrylate, isocyanuric acid alkylene oxide-modified acrylate, pentaerythritol triacrylate, dipentaerythritol hexaacrylate, dimethylol tricyclodecane diacrylate, tripropylene glycol triacrylate, diethylene glycol diacrylate, 1,6-hexanediol diacrylate, epoxy-modified acrylate, urethane-modified acrylate, and epoxy-modified acrylate. These may be used either individually or in a combination of several kinds. Depending on situations, hydrolyzed products of various alkoxysilanes may be added in appropriate amounts. When ionizing radiation is used to polymerize the resin layer, an appropriate amount of a known photopolymerization initiator is added. Further, a photosensitizer may be added in appropriate amounts, as required.

Examples of the photopolymerization initiator include acetophenones, benzophenones, benzoins, benzoyl benzoates, and thioxanthenes. Examples of the photosensitizer include triethylamine, and tri-n-butylphosphine.

Examples of the heat curable resin include: organosilane-based heat curable resins whose monomer constituent is a silane compound such as methyltriethoxysilane and phenyl-triethoxysilane; melamine-based heat curable resins whose monomer constituent is an etherified methylol melamine or other melamine compounds; isocyanate-based heat curable resins; phenol-based heat curable resins; and epoxy-based heat curable resins. These heat curable resins may be used either individually or in a combination of two or more. A thermoplastic resin may be added as required. When cross-linking of the resin layer is achieved by heat, a known reaction accelerator and a known curing agent are added in appropriate amounts.

Examples of the reaction accelerator include triethylenediamine, dibutyltin dilaurate, benzylmethylamine, and pyridine. Examples of the curing agent include methylhexahydrophthalic acid anhydride, 4,4'-diaminodiphenylmethane, 4,4'-diamino-3,3'-diethyldiphenylmethane, and diaminodiphenylsulfone.

Considering flexibility and abrasion resistance, the thickness of the cured resin layer is preferably 10 μm or less, more preferably 5 μm or less, although the lower limit is not particularly limited.

In order to further improve adhesion between the cured resin layer and the first transparent conductive layer, or between the cured resin layer and the metal oxide layer, the cured resin layer may contain silicon oxide fine particles having an average primary particle diameter of 100 nm or less. Further, the silicon oxide fine particles having an average primary particle diameter of 100 nm or less may be used with an organic compound containing a silicon atom. In this case, the metal oxide fine particles in the silicon oxide fine particles segregate at the surface of the resulting cured resin layer, and enhance the adhesion improving effect. The organic compound containing a silicon atom is a common surfactant or UV curable resin component containing a Si atom. The content of the silicon oxide fine particles is preferably at least 1 part by weight and at most 400 parts by weight, more preferably at least 1 part by weight and at most 200 parts by weight, further preferably at least 5 parts by weight and at most 100 parts by weight, with respect to 100 parts by weight of the curable resin component.

When the both surfaces of the oppositely disposed transparent conductive layers forming the transparent touch panel are flat, there are cases where Newton's rings are observed that result from the interference caused by the reflected light from the movable electrode substrate (upper electrode substrate) of the produced transparent touch panel, and the reflected light from the fixed electrode substrate (lower electrode substrate).

One way to optically scatter the reflected light and prevent Newton's rings is to form irregularities on the surface of the transparent conductive layer. Irregularities can be formed on the surface of the transparent conductive layer by roughening the surface of the cured resin layer. This can be achieved, for example, by the following four methods.

(1) Irregularities are formed by the phase separation of two components, without including fine particles in the cured resin layer to roughen the surface. The arithmetic mean roughness (Ra) of the cured resin layer is set to at least 0.05 μm and less than 0.5 μm according to JIS B0601-1994, and the ten-point mean roughness (Rz) is set to at least 0.5 μm and less than 2 μm according to JIS B0601-1982.

Regarding the components of the cured resin layer, a first component is preferably a polymer, and a second component is preferably a monomer. Preferably, the difference in SP value between the first and second components forming the cured resin layer is 0.5 or more. The first component of the cured resin layer is preferably an unsaturated double bond-containing acryl copolymer, and the second component is preferably a multifunctional unsaturated double bond-containing monomer. Preferably, the components of the cured resin layer are a silicone-acryl block copolymer and an acryl copolymer.

A transparent conductive multilayer body of the present invention roughened by this method can achieve a haze of 1% or more and less than 20% as measured according to JIS K7136.

(2) The cured resin layer is roughened by including therein a curable resin component, and one kind of fine particles C having an average primary particle diameter greater than 0.1 µm, or two or more kinds of fine particles C having different average primary particle diameters, wherein the average primary particle diameter of at least one kind of fine particles C is greater than the thickness of the cured resin layer by a factor of at least 1.2.

The content of the fine particles C contained in the cured resin layer is at least 0.1 parts by weight and at most 30 parts by weight, preferably at least 1 part by weight and at most 20 parts by weight, further preferably at least 3 parts by weight and at most 15 parts by weight, with respect to 100 parts by weight of the curable resin component. When the content of fine particles C is less than 0.1 parts by weight, the cured resin layer will not be roughened sufficiently, and the Newton's rings cannot be prevented. When the content of fine particles C is above 30 parts by weight, the haze of the cured resin layer will be excessively large. This makes it difficult to ensure transparency, preventing a clear view of the screen through the transparent touch panel provided over the screen.

(3) The cured resin layer is roughened by including therein a curable resin component, and one or more kinds of fine particles D formed of metal oxide or metal fluoride fine particles having an average primary particle diameter of 100 nm or less.

The content of the fine particles D contained in the cured resin layer is at least 0.1 parts by weight and at most 100 parts by weight, preferably at least 0.5 parts by weight and at most 50 parts by weight, more preferably at least 1 part by weight and at most 30 parts by weight, with respect to 100 parts by weight of the curable resin component. When the content of fine particles D is less than 0.1 parts by weight, the cured resin layer will not be roughened sufficiently, and the Newton's rings cannot be prevented. When the content of fine particles D is above 100 parts by weight, the haze of the cured resin layer will be excessively large. This makes it difficult to ensure transparency, preventing a clear view of the screen through the transparent touch panel provided over the screen.

(4) The cured resin layer is roughened by including therein a curable resin component, one or more kinds of fine particles C having an average primary particle diameter of more than 0.1 µm, and one or more kinds of fine particles D formed of metal oxide or metal fluoride fine particles having an average primary particle diameter of 100 nm or less, wherein the average primary particle diameter of at least one kind of fine particles C is greater than the thickness of the cured resin layer by a factor of at least 1.2.

The contents of the fine particles C and the fine particles D in the cured resin layer are as noted above.

When the surface of the cured resin layer is roughened using the foregoing methods (2) to (4), the ten-point mean roughness (Rz) defined by JIS B0601-1982 is preferably at least 100 nm and less than 1,500 nm, more preferably at least 200 nm and less than 1,300 nm, further preferably at least 350 nm and less than 1,000 nm. When the ten-point mean roughness (Rz) is less than 100 nm, Newton's rings may easily occur between the movable electrode substrate and the fixed electrode substrate of the transparent touch panel. A ten-point mean roughness (Rz) of 1,000 nm or more is not preferable because it increases haze, and causes color separation in the pixels and generates flicker when the transparent touch panel is installed on a high-resolution display, among other reasons. The arithmetic mean roughness (Ra) defined by JIS B0601-1994 is preferably at least 30 nm and less than 500 nm, more preferably at least 40 nm and less than 400 nm, further preferably at least 50 nm and less than 300 nm. When the arithmetic mean roughness (Ra) is less than 30 nm, Newton's rings may easily occur between the movable electrode substrate and the fixed electrode substrate of the transparent touch panel. An arithmetic mean roughness (Ra) of 500 nm or more is not preferable because it increases haze, and causes color separation in the pixels and generates flicker when the transparent touch panel is installed on a high-resolution display, among other reasons.

The haze based on the cured resin layer roughened by the foregoing methods (2) to (4) and the polymer film, as defined by JIS K7105, is 1% or more and less than 10, preferably 1% or more and less than 8%, more preferably 1% or more and less than 6%. A haze of less than 1% is not preferable because it may easily generate Newton's rings between the movable electrode substrate and the fixed electrode substrate of the transparent touch panel. A haze of 10% or more is not preferable either because it blurs information, such as images and characters, when the transparent touch panel is installed on a display.

The following specifically describes the method (1) of roughing the surface of the cured resin layer.

In the roughing method (1), irregularities are formed by the phase separation of two kinds of component. The cured resin layer is free of fine particles that impart irregularities. The irregularities are random irregularities formed on the surface by the phase separation of the first and second components caused by a difference in property of these components when a composition containing the first and second components is applied to a base material. The cured resin layer can be formed upon curing after applying the composition to the base material and forming irregularities. The first and second components forming the cured resin layer are preferably a polymer and a monomer, respectively.

The first component is preferably a curable polymer that excels in transparency. Preferable examples are heat curable polymers, and ionizing radiation curable polymers. The polymer may be known polymers, for example, such as those described in the pamphlet of International Publication 2005/073763. The first component is preferably an unsaturated double bond-containing acryl copolymer (hereinafter, also referred to as copolymer (1)). Examples of copolymer (1) include: a copolymer obtained by the reaction of a monomer having an ethylenic unsaturated double bond and an epoxy group with a resin obtained by polymerizing or copolymerizing a (meth)acryl monomer or other polymerizable unsaturated monomers having an acid group, or a resin obtained by copolymerizing a polymerized or copolymerized resin of polymerizable unsaturated monomers having an acid group with other monomers having an ethylenic unsaturated double bond; and a copolymer obtained by the reaction of a polymerizable unsaturated monomer having an acid group with other monomers having an ethylenic unsaturated double bond and an isocyanate group.

In one specific exemplary method of preparing an unsaturated double bond-containing acryl copolymer, a polymerizable unsaturated monomer having an acid group is copolymerized with other polymerizable unsaturated monomers, and the acid group of the resulting copolymer is allowed to react with the epoxy group of an epoxy group-containing ethylenic unsaturated monomer.

Example of the polymerizable unsaturated monomer having an acid group include: monocarboxylic acids such as acrylic acid, methacrylic acid, crotonic acid, 2-(meth)-acryloyloxy ethyl succinic acid, 2-(meth)acryloyloxy ethyl phthalic acid, and 2-(meth)acryloyloxy ethyl hexahydrophthalic acid; dicarboxylic acids such as maleic acid, fumaric acid, citraconic acid, mesaconic acid, and itaconic acid; acid anhydrides such as maleic acid anhydride and itaconic acid anhydride; monoesters of dicarboxylic acids, such as monoethyl maleate, monoethyl fumarate, and monoethyl itaconate, or substitution derivatives thereof with a haloalkyl, an alkoxy, a halogen, a nitro, or a cyano at the alpha position; o-, m-, and p-vinyl benzoates, or substitution derivatives thereof with an alkyl, an alkoxy, a halogen, a nitro, acyano, an amide, or an ester. These may be used either individually or in a combination of two or more.

Examples of the other polymerizable unsaturated monomers include: styrenes or substitution derivatives thereof with an a-, o-, m-, p-alkyl, alkoxy, halogen, haloalkyl, nitro, cyano, amide, or ester; olefins such as butadiene, isoprene, and neoprene; o-, m-, p-hydroxystyrenes or substitution derivatives thereof with an alkyl, an alkoxy, a halogen, a haloalkyl, a nitro, a cyano, an amide, an ester, or a carboxy; polyhydroxy vinyl phenols such as vinyl hydroquinone, 5-vinylpyroganol, 6-vinylpyrogallol, and 1-vinylphloroglucinol; methyl, ethyl, n-propyl, i-propyl, n-butyl, sec-butyl, ter-butyl, pentyl, neopentyl, isoamylhexyl, cyclohexyl, adamantyl, allyl, propargyl, phenyl, naphthyl, anthracenyl, anthraquinonyl, piperonyl, salicyl, cyclohexyl, benzil, phenethyl, cresyl, glycidyl, isobornyl, triphenylmethyl, dicyclopentanyl, cumyl, 3-(N,N-dimethylamino)propyl, 3-(N,N-dimethylamino)ethyl, furyl, or furfuryl esters of methacrylic acids or acrylic acids; anilides or amides of methacrylic acids or acrylic acids; N,N-dimethyl, N,N-diethyl, N,N-dipropyl, N,N-diisopropyl, or anthranilamide; acrylonitrile; acrolein; methacrylonitrile; vinyl chloride; vinylidene chloride; vinyl fluoride; vinylidene fluoride; N-vinylpyrrolidone; vinylpyridine; vinyl acetate; N-phenylmaleimide; N-(4-hydroxyphenyl)maleimide; N-methacryloylphthalimide, and N-acryloylphthalimide.

Examples of the epoxy-containing ethylenic unsaturated monomer include glycidyl(meth)acrylate, β-methylglycidyl (meth)acrylate, 3,4-epoxy cyclohexanyl(meth)acrylate, and 4-hydroxybutyl acrylate glycidyl ether. Use of glycidyl (meth)acrylate is preferable because it has balanced curing properties and storage stability.

In one specific exemplary method of preparing the unsaturated double bond-containing acryl copolymer, the epoxy group-containing ethylenic unsaturated monomer and other polymerizable unsaturated monomers are copolymerized, and the epoxy group of the resulting copolymer is allowed to react with the acid group of a polymerizable unsaturated monomer having an acid group.

In the present invention, the weight average molecular weight of the unsaturated double bond-containing acryl copolymer used as the first component is preferably 500 to 100,000, more preferably 1,000 to 50,000. As used herein, the "weight average molecular weight" means a weight average molecular weight in terms of polystyrene. The unsaturated double bond-containing acryl copolymers may be used either alone or in a combination of two or more.

The second component is a monomer that undergoes phase separation upon mixing with copolymer (1). The monomer may be known monomers, for example, such as those described in the pamphlet of International Publication 2005/073763.

The second component is preferably a multifunctional unsaturated double bond-containing monomer (hereinafter, also referred to as "monomer (2)"). Examples of monomer (2) include dealcoholization reaction products of polyalcohol and (meth)acrylate. Specific examples include pentaerythritol triacrylate, dipentaerythritol hexa(meth)acrylate, dipentaerythritol penta(meth)acrylate, trimethylolpropane tri(meth)acrylate, ditrimethylolpropane tetra(meth)acrylate, and neopentyl glycol di(meth)acrylate. Other than these, acrylate monomers having a polyethylene glycol backbone, such as a polyethyleneglycol #200 diacrylate (Kyoeisha Chemical Co., Ltd.), may be used. These multifunctional unsaturated double bond-containing monomers may be used either alone or in a combination of two or more.

The first and second components forming the cured resin layer are preferably an unsaturated double bond-containing acryl copolymer and a multifunctional unsaturated double bond-containing monomer, respectively.

The components of the cured resin layer are preferably a silicone-acryl block copolymer and an acryl copolymer.

It is preferable that the first component and the second component have different solubility parameters (SP values). When the first component is copolymer (1), and the second component is monomer (2) as above, it is preferable that the SP value of the first component (SP1) and the SP value of the second component (SP2) be related to satisfy SP1<SP2. It is also preferable that the difference in SP value between the first component and the second component be 0.5 or more.

It is preferable that the first component be copolymer (1), and the second component be monomer (2), because this eliminates flicker, reduces haze, and greatly improves slide durability and edge pressure durability when a transparent conductive multilayer body of the present invention is used for a touch panel.

In a transparent conductive multilayer body of the present invention, the arithmetic mean roughness (Ra) of the cured resin layer according to JIS B0601-1994 is at least 0.05 μm and less than 0.5 μm. The ten-point mean roughness (Rz) of the cured resin layer according to JIS B0601-1982 is at least 0.5 μm and less than 2 μm.

With Ra and Rz in these ranges, the properties of the touch panel using the transparent conductive multilayer body can be improved, particularly in regard to anti-glare property, anti-Newton's rings property, and fingerprint wipability. It also greatly reduces flicker. To further improve these properties, it is preferable that the Ra range be 0.1 μm or more and less than 0.4 μm, more preferably 0.1 μm or more and less than 0.35 μm. The Rz range is preferably 0.7 μm or more and less than 1.5 μm, more preferably 0.7 μm or more and less than 1.3 μm.

The thickness of the cured resin layer is preferably 10 μm or less. Above 10 μm, a sufficient flexibility may not be provided, and the slide durability and edge pressure durability of the touch panel may suffer. To further improve the foregoing properties, it is preferable that the thickness of the cured resin layer be 8 μm or less, particularly preferably 6 μm or less.

The cured resin layer can be formed by applying a coating solution containing the first and second components onto a polymer film, drying it as required, and curing it by irradiation of ionizing radiation or other treatments such as a heat treatment. It is preferable that the coating solution contain an organic solvent.

For coating, methods using known coating machines such as a doctor knife, a bar coater, a gravure roll coater, a curtain coater, a knife coater, and a spin coater can be used. Methods such as a spray method and an immersion method can also be used.

When forming the cured resin layer on the both surfaces of the polymer film, the cured resin layer may have the same composition or different compositions.

When the roughing method (1) is not used, the cured resin layer can be formed by methods using known coating machines such as a doctor knife, a bar coater, a gravure roll coater, a curtain coater, a knife coater, and a spin coater. Methods such as a spray method and an immersion method can also be used. In actual practice, the coating may be formed as follows. The curable resin component is dissolved in various kinds of organic solvents, and the concentration or viscosity is adjusted. The coating solution so prepared is then applied onto a transparent organic polymer substrate, and the layer is formed by exposure to radiation or other treatments such as a heat treatment.

As the organic solvent, alcohol solvents and hydrocarbon solvents are preferable. Examples include ethanol, isopropylalcohol, butanol, 1-methoxy-2-propanol, hexane, cyclohexane, and ligroin. Xylenes, toluenes, and ketones are particularly preferable. For example, methyl ethyl ketone, and methyl isobutyl ketone can be preferably used. Other than these, polar solvents, for example, such as cyclohexanone, butyl acetate, and isobutyl acetate can also be used. These may be used either individually or as a mixed solvent of two or more.

For the purpose of preventing the heat or light degradation of the cured resin layer, additives such as an ultraviolet light absorber, an antioxidant, or an anti-aging agent may be added.

The optical properties such as transmittance and tone of the transparent conductive multilayer body can be adjusted by adjusting the thickness or refractive index of the cured resin layer. For this purpose, the thickness of the cured resin layer is preferably 0.05 μm or more and 0.5 μm or less, more preferably 0.05 μm or more and 0.3 μm or less. To adjust the refractive index of the cured resin layer, fine particles D of metal oxide or metal fluoride having an average primary particle diameter of 100 nm or less, and/or a fluororesin may be added to the cured resin layer either alone or in combination. Here, it is preferable that the refractive index of the cured resin be preferably smaller than the refractive index of the polymer film, and 1.20 or more and 1.55 or less, more preferably 1.20 or more and 1.45 or less.

As required, two or more kinds of cured resin layers of different material or different hardness may be laminated. For example, (A) a cured resin layer having irregularities and a thickness of 2.0 μm, and that contains fine particles C and fine particles D is first laminated on the polymer film, and then a low-refractive-index cured resin layer having a refractive index of 1.4 and a thickness of 0.1 μm is laminated on the cured resin layer. (B) A cured resin layer containing a rubber latex having a thickness of 10 μm is formed on the polymer film, and a UV curable resin layer having a thickness of 2 μm, and that is made of a difunctional to tetrafunctional UV curable resin is laminated on the rubber latex layer.

Fine Particles C

The fine particles C contained in the cured resin layer have an average primary particle diameter of greater than 0.1 μm. Specific examples of fine particles C include inorganic fine particles such as silica fine particles; and organic fine particles such as crosslinked acryl fine particles, and crosslinked polystyrene.

Fine Particles D

The average primary particle diameter of fine particles D is preferably 100 nm or less, more preferably 75 nm or less, further preferably 50 nm or less. With the primary particle diameter of fine particles D confined within a range of 100 nm or less, the coating layer does not turn white.

Examples of fine particles D include ultrafine particles of metal oxide or metal fluoride such as $Bi_2O_3$, $CeO_2$, $In_2O_3$, $(In_2O_3.SnO_2)$, $HfO_2$, $La_2O_3$, $MgF_2$, $Sb_2O_5$, $(Sb_2O_5.SnO_2)$, $SiO_2$, $SnO_2$, $TiO_2$, $Y_2O_3$, ZnO, and $ZrO_2$.

Optical Interference Layer

A transparent conductive multilayer body of the present invention may include an optical interference layer between the polymer film or the cured resin layer and the first transparent conductive layer or the metal oxide layer. The optical interference layer includes a low-refractive-index layer of at least a single layer, and a high-refractive-index layer of at least a single layer. The low-refractive-index layer is in contact with the metal oxide layer or the first transparent conductive layer.

As noted above, the optical interference layer includes a high-refractive-index layer of at least a single layer, and a low-refractive-index layer of at least a single layer. The high-refractive-index layer and the low-refractive-index layer may be provided in plural sets. When the optical interference layer includes a single high-refractive-index layer, and a single low-refractive-index layer, the thickness of the optical interference layer is preferably from 30 nm to 300 nm, more preferably 50 nm to 200 nm. The optical interference layer improves adhesion between the layers, and the optical properties, particularly transmittance and tone, of the transparent conductive multilayer body.

For example, the high-refractive-index layer is a layer formed by hydrolysis and condensation polymerization of metal alkoxide, or a layer including at least one of a component obtained by hydrolysis and condensation polymerization of metal alkoxide, and/or a heat curable resin component, and/or an ionizing radiation curable resin component, and at least fine particles D of metal oxide or metal fluoride having an average primary particle diameter of 100 nm or less.

Examples of the metal alkoxide include titanium alkoxide, zirconium alkoxide, and alkoxysilane.

Examples of the titanium alkoxide include titanium tetraisopropoxide, tetra-n-propyl o-titanate, titanium tetra-n-butoxide, and tetrakis(2-ethylhexyloxy)titanate.

Examples of the zirconium alkoxide include zirconium tetraisopropoxide, and zirconium tetra-n-butoxide.

For alkoxysilanes, those exemplified in conjunction with the second transparent conductive layer can be used.

The high-refractive-index layer may contain appropriate amounts of one or more kinds of fine particles D of metal oxide or metal fluoride having an average primary particle diameter of 100 nm or less. The refractive index of the high-refractive-index layer can be adjusted by adding fine particles D.

When adding fine particles D in the high-refractive-index layer, the weight ratio of fine particles D and the metal alkoxide, and/or the heat curable resin, and/or the ionizing radiation curable resin is preferably 0:100 to 66.6:33.3, more preferably 0:100 to 60:40. A weight ratio of the fine particles D and the metal alkoxide, and/or the heat curable resin, and/or the ionizing radiation curable resin in excess of 66.6:33.3 is not preferable, because, in this case, sufficient strength and sufficient adhesion may not be provided for the optical interference layer.

The thickness of the high-refractive-index layer is preferably 15 nm to 250 nm, more preferably 30 nm to 150 nm. It is preferable that the refractive index of the high-refractive-index layer be greater than the refractive indices of the low-refractive-index layer (described below) and the cured resin layer, and that the difference be 0.2 or more.

The low-refractive-index layer forming the optical interference layer of the present invention can be formed by using the resin alkoxysilane, exemplified above as the alkoxysilane for the second transparent conductive layer, or the ionizing radiation curable resin or heat curable resin exemplified above for the cured resin layer.

For the purposes of improving adhesion for the first transparent conductive layer or the metal oxide layer, and adjusting the refractive index, one or more kinds of fine particles D of metal oxide or metal fluoride having an average primary particle diameter of 100 nm or less may be added in appropriate amounts. For this purpose, materials with a low refractive index, such as $SiO_2$ and $MgF_2$ can be suitably used as the fine particles D. The thickness of the low-refractive-index layer is preferably 15 nm to 250 nm, more preferably 30 nm to 150 nm.

Hardcoat Layer

When using a transparent conductive multilayer body of the present invention as the movable electrode substrate, it is preferable to provide a hardcoat layer on the side of the touch panel subjected to external force, i.e., the side of the polymer film opposite from the transparent conductive layer. Examples of the material used to form the hardcoat layer include: organosilane-based heat curable resins such as methyltriethoxysilane and phenyltriethoxysilane; melamine-based heat curable resins such as etherified methylol melamine; and multifunctional acrylate-based UV curable resins such as polyol acrylate, polyester acrylate, urethane acrylate, and epoxy acrylate. Further, these may be used with other components such as fine particles of, for example, $SiO_2$ or $MgF_2$, as required. In this case, the fine particles are uniformly dispersed in the hardcoat layer. Considering flexibility and abrasion resistance, the thickness of the hardcoat layer is preferably 2 μm to 5 μm.

The hardcoat layer can be formed by a coating method. In actual practice, the coating is formed as follows. The foregoing compounds are dissolved in various kinds of organic solvents, and the concentration or viscosity is adjusted. The coating solution so prepared is then applied onto a transparent organic polymer film, and the layer is cured by exposure to radiation or other treatments such as a heat treatment. Examples of the coating method include a micro gravure coating method, a Meyer bar coating method, a direct gravure coating method, a reverse roll coating method, a curtain coating method, a spray coating method, a comma coating method, a die coating method, a knife coating method, and a spin coating method.

The hardcoat layer is laminated either directly on the polymer film, or via an appropriate anchor layer. Preferable examples of the anchor layer include: a layer that functions to improve the adhesion between the hardcoat layer and the polymer film; various types of phase compensation layers, such as those having three-dimensional refractive index characteristics to provide a negative K value; a layer that functions to prevent passage of moisture or air, or absorb moisture or air; a layer that functions to absorb ultraviolet light or infrared rays; and a layer that functions to lower the electrostatic propensity of the film.

Touch Panel

A transparent conductive multilayer body of the present invention, when used at least as a transparent electrode substrate in a touch panel configured to include oppositely disposed transparent conductive layers, can provide a transparent touch panel having improved write durability, particularly in the edge portions (slide durability and edge pressure durability).

EXAMPLES

The following describes the present invention in more detail based on Examples. It should be noted, however, that the present invention is in no way limited by the following descriptions.

In the Examples, measurements and evaluations were conducted according to the methods described below.

Linearity Measurement Method

A DC voltage of 5V was applied across the parallel electrodes on a movable electrode substrate or a fixed electrode substrate, and a voltage was measured at the 5 mm intervals in a direction perpendicular to the parallel electrodes. Linearity L was measured according to following equation.

$$E_T=(E_B-E_A)\times X/(B-A)+E_A$$

$$L(\%)=(|E_T-E_x|)/(E_B-E_A)\times 100, \quad \text{[Equation 1]}$$

where A is the measurement start position, $E_A$ is the voltage at A, B is the measurement end position, $E_B$ is the voltage at B, X is the distance from A, $E_X$ is the measured voltage value at distance X, and $E_T$ is the theoretical value.

Edge Pressure Durability Test Method

In a write durability test, a polyacetal pen (tip size, R=0.8) was moved back and forth in straight line for a total of 100,000 times under a load of 450 g, parallel to the insulating layer surrounding the movable electrode substrate of the produced transparent touch panel, and at positions 2.0 mm and 1.5 mm from the insulating layer. Linearity was measured before and after the edge pressure durability test, and samples that had a linearity change of 1.5% or more were evaluated as "Problematic".

Measurements of Haze and Light Transmittance

Haze was measured using a haze meter NDH 200 available from Nippon Denshoku Industries Co., Ltd. Light transmittance was measured according to JIS K7316-1.

Evaluation of Environmental Reliability (High-Temperature and High-Humidity Reliability)

The surface resistivity R1 at the surface of the transparent conductive layer of the transparent conductive multilayer body was measured at room temperature. Then, the transparent conductive multilayer body was kept in an environment of 60° C. and 90% RH for 240 hours. Back in a room environment, the surface resistivity R2 at the surface of the transparent conductive layer was measured at room temperature. A change in surface resistivity (R2/R1) was determined from the measured values of R2 and R1. The high-temperature and high-humidity reliability was evaluated as being desirable when a change in surface resistivity was from 0.8 to 1.2.

Evaluation of Environmental Reliability (High-Temperature Reliability)

The surface resistivity R1 at the surface of the transparent conductive layer of the transparent conductive multilayer body was measured at room temperature. Then, the transparent conductive multilayer body was kept in an 80° C. dry (absolute dry) environment for 240 hours. Back in a room environment, the surface resistivity R2 at the surface of the transparent conductive layer was measured at room temperature. A change in surface resistivity (R2/R1) was determined from the measured values of R2 and R1. The high-temperature reliability was evaluated as being desirable when a change in surface resistivity was from 0.8 to 1.2.

Average Primary Particle Diameter of Fine Particles

The average primary particle diameter of fine particles was measured using a laser diffraction/scattering particle distribution measurement device.

SP (Solubility Parameter)

Calculation was made according to the method of Van Klevin described in "Properties of Polymers" (Elsevier, Amsterdam (1976)).

Ra (Arithmetic Mean Roughness)

Measurement was made using a stylus surface profiler DEKTAK3 (Sloan) according to JIS B0601-1994.

Rz (Ten-Point Mean Roughness)

Measurement was made using a Surfcorder SE-3400 (Kosaka Laboratory Ltd.) according to JIS B0601-1982.

Contact Angle

A flat sample piece was horizontally laid, with the cured resin layer side facing up. Then, water was dropped once on the sample piece using a 1-ml volume syringe, according to the sessile drop method of JIS R3257. The droplet on the sample piece was 1 μl or more and 4 μl or less. After standing for one minute, the contact angle θ of the water was read using a microscope equipped with an angle finder.

Thickness

Measurement was made using a stylus thickness meter Alpha Steck (KLK-Tencor).

Anti-Glare Property

A fluorescent lamp was reflected on the surface of the cured resin layer of the produced transparent conductive multilayer body on the opposite side of the transparent conductive layer. The edges of the fluorescent lamp reflecting on the surface of the cured resin layer were observed to evaluate anti-glare property. The result of evaluation was rated "Desirable", "Acceptable", or "poor".

Anti-Newton's Ring Property

Under three-band fluorescent light, the presence or absence of Newton's rings was visually inspected from a 60° angle direction with respect to a direction (0°) perpendicular to the surface of the touch panel, over a region where the movable electrode substrate and the fixed electrode substrate were in contact with each other. The result was rated "Desirable" (Newton's rings are not visible), "Acceptable" (slightly visible), or "Poor" (clearly visible).

Flicker

A touch panel was installed on a liquid crystal display (about 123 dpi; 10.4 inches diagonal; XGA, 1024×768 dots), and the presence or absence of a flicker was visually inspected. The result was rated "Desirable" (no flicker), "Acceptable" (slightly present), and "Poor" (clearly visible).

Slide Durability

A polyacetal pen (tip size, R=0.8) was slid back and forth in straight line for a total of at most 300,000 times (each set consisting of 100,000 times) under a load of 450 g at the middle portion of the produced touch panel. The linearity of the touch panel was measured before and after the slide durability test, and samples that had a linearity change of less than 1.5% were evaluated as desirable (No problem), and a linearity change of 1.5% or more as undesirable (Problematic). The slide strokes were counted, and the number at which the electrical properties failed was recorded.

Edge Pressure Durability B

A polyacetal pen (tip size, R=0.8) was slid back and forth in straight line for a total of 100,000 times (each set consisting of 10,000 times) under a load of 450 g from the movable electrode side, parallel to the insulating layer of the produced transparent touch panel, and at a position about 2.0 mm from the insulating layer. The linearity of the touch panel was measured before and after the edge pressure durability test, and samples that had a linearity change of less than 1.5% were evaluated as desirable (No problem), and a linearity change of 1.5% or more as undesirable (Problematic) The slide strokes were counted, and the number at which the electrical properties failed was recorded.

Fingerprint Wipability

A measurement sample was placed on a black board with the cured resin layer side facing up. A finger was placed on the sample surface to leave a fingerprint, which was then wiped with a commercially available tissue paper. The extent of the remaining fingerprint on the sample surface was checked by visual inspection.

The result was rated "Desirable" (not visible), "Acceptable" (slightly visible), and "Poor" (clearly visible).

Surface Tension Surface tension was measured using a ring method (Du Nouy method) with a dynometer (BYK-Chemie).

Reference Example 1

Production of Coating Solution A 100 parts by weight of tetrafunctional acrylate Aronix M 400 (Toagosei Co., Ltd.), 5 parts by weight of Irgacure 184 (Ciba Speciality Chemicals), and 0.7 parts by weight of Hipresica (3.0 am; grade N3N; Ube-Nitto Kasei Co., Ltd.) were dissolved in a 1:1 mixed solvent of isopropyl alcohol and 1-methoxy-2-propanol. Then, $MgF_2$ ultrafine particles (a 20 weight % ethyl alcohol-n-butyl alcohol mixed solvent dispersion; C.I. Kasei Co., Ltd.) having an average primary particle diameter of 30 nm were added in a solid content of 5 parts by weight with respect to 100 parts by weight of the curable resin component to produce coating solution A.

Reference Example 2

Production of Coating Solution B

γ-Glycidoxypropyl trimethoxysilane (KBM-403, Shin-Etsu Chemical Co., Ltd.) and methyltrimethoxysilane (KBM-13, Shin-Etsu Chemical Co., Ltd.) were mixed at a molar ratio of 1:1, and the alkoxysilane was hydrolyzed with an acetic acid aqueous solution (pH=3.0) using a known method. As a result, alkoxysilane hydrolyzed product 1 was obtained. Then, N-β (aminoethyl) γ-aminopropylmethoxysilane (KBM-603, Shin-Etsu Chemical Co., Ltd.) was added in a solid content of 1 part by weight with respect to a 20 parts by weight solid content of the alkoxysilane hydrolyzed product 1. The mixture was diluted with a mixed solution of isopropylalcohol and n-butanol. Then, a 15% dispersion of crystalline ITO nanoparticles (an average primary particle diameter of 20 nm) in isopropyl alcohol (C.I. Kasei Co., Ltd.) was mixed with the foregoing mixture in a solid content of 50 parts by weight to produce alkoxysilane coating solution B.

Reference Example 3

Production of Coating Solution C 100 parts by weight of tetrafunctional acrylate Aronix M 400 (Toagosei Co., Ltd.), and 5 parts by weight of Irgacure 184 (Ciba Speciality Chemicals) were dissolved in a 1:1 mixed solvent of isopropyl alcohol and 1-methoxy-2-propanol to produce coating solution C.

Reference Example 4

Production of Coating Solution D

A 12.5 wt % dispersion of $SiO_2$ nanoparticles (an average primary particle diameter of 20 nm) in isopropyl alcohol (C.I. Kasei Co., Ltd.) was mixed in a solid content of 20 parts by weight with respect to 100 parts by weight of the resin in the coating solution C prepared in Reference Example 3, together with 0.3 parts by weight (solid content) of a surfactant SH28PA (Dow Corning Toray Co., Ltd.), so as to prepare coating solution D.

Reference Example 5

Production of Coating Solution E

Silicon oxide fine particles having an average primary particle diameter of 1.0 μm were mixed with the coating solution B of Reference Example 2 to produce coating solution E. The content of the silicon oxide fine particles is 1.0 part by weight with respect to 100 parts by weight of the alkoxysilane component.

Reference Example 6

Production of Coating Solution F 4 parts by weight of an unsaturated double bond-containing acryl copolymer (first component; SP value, 10.0; Tg, 92° C.), 100 parts by weight of pentaerythritol triacrylate (second component; SP value, 12.7), and 7 parts by weight of a photopolymerization initiator Irgacure 184 (Ciba Speciality Chemicals) were dissolved in an isobutyl alcohol solvent in a solid content of 40 weight %.

The unsaturated double bond-containing acryl copolymer (SP value, 10.0; Tg, 92° C.) was prepared according to the following procedure.

171.6 g of isobornyl methacrylate, 2.6 g of methylmethacrylate, and 9.2 g of methylacrylic acid were mixed together. The mixture was then dropped onto 330.0 g of propylene glycol monomethyl ether heated to 110° C. in a nitrogen atmosphere in a 1,000-ml reaction vessel equipped with a stir vane, a nitrogen influx pipe, a condenser, and a dripping funnel. The mixture was dropped for 3 hours at a constant speed, together with a solution of propylene glycol monomethyl ether (80.0 g) containing tert-butyl peroxy-2-ethylhexanoate (1.8 g). Then, the mixture was allowed to react for 30 minutes at 110° C.

Thereafter, 5.0 g of a propylene glycol monomethyl ether solution containing 1.4 g of tetrabutyl ammonium bromide and 0.1 g of hydroquinone was added by dropping a solution of propylene glycol monomethyl ether (17.0 g) and tert-butyl peroxy-2-ethylhexanoate (0.2 g). With air bubbling, a solution containing 22.4 g of 4-hydroxybutyl acrylate glycidyl ether and 5.0 g of propylene glycol monomethyl ether was dropped for 2 hours, and the mixture was allowed to react for 5 hours. The resulting unsaturated double bond-containing acryl copolymer had a number average molecular weight of 5,500, and a weight average molecular weight of 18,000. The resin had an SP value of 10.0, a Tg of 92° C., and a surface tension of $31 \times 10^{-3}$ N/m (31 dyn/cm).

Example 1

A clear hardcoat layer having a thickness of 4 μm was formed on one surface of a polyethylene terephthalate film having a thickness of 188 μm (OFW, Teijin DuPont Films), using a UV curable multifunctional acrylate resin coating material.

The coating solution A prepared in Reference Example 1 was then coated on the surface opposite from the hardcoat layer in a thickness of 2.0 μm, using a bar coat method. After drying at 50° C. for 1 minute, the coating was irradiated with ultraviolet light to form a cured resin layer having irregularities. The film haze after forming the cured resin layer was 2.4%.

Then, using a sputtering method, an ITO layer was formed on the cured resin layer, using an indium oxide-tin oxide target (an indium oxide to tin oxide weight ratio of 95:5; fill density, 98%). The thickness of the ITO layer so formed was about 20 nm, and the surface resistivity after forming the ITO was about 350Ω/□ (Ω/sq.).

Thereafter, the coating solution B produced according to the procedure of Reference Example 2 was coated on the surface of the first transparent conductive layer to a thickness of about 200 nm, using a bar coat method. The coating was baked at 130° C. for 2 minutes to form a second transparent conductive layer, thereby producing a transparent conductive multilayer body that serves as the movable electrode substrate. The surface resistivity after laminating the first transparent conductive layer and the second transparent conductive layer was about 270Ω/□ (Ω/sq.). The movable electrode substrate so produced was subjected to a heat treatment at 150° C. for 90 minutes to crystallize the first transparent conductive layer (ITO layer). The surface resistivity after crystallizing the ITO layer was about 210Ω/□ (Ω/sq.). The environmental reliability properties of the produced transparent conductive multilayer body are presented in Table 1. The crystal grain size as observed with a TEM fell in a range of from 50 nm to 200 nm.

Separately, an ITO layer having a thickness of 18 nm was formed in the same manner by dip coating $SiO_2$ on the both surfaces of a glass substrate having a thickness of 1.1 mm, followed by sputtering. Then, dot spacers (height, 7 μm; diameter, 70 μm; pitch, 1.5 mm) were formed on the ITO layer to produce a fixed electrode substrate. The fixed electrode substrate and the movable electrode substrate produced as above were used to produce a transparent touch panel shown in FIG. 1. In FIG. 1, 1 denotes a hardcoat layer, 2 denotes a polymer film, 3 denotes a cured resin layer, 4 denotes a first transparent conductive layer, 5 denotes a second transparent conductive layer, 6 denotes a glass substrate, and 9 denotes dot spacers.

The transparent touch panel so obtained was subjected to a slide durability test and an edge pressure durability test. A change in linearity before and after the test is presented in Table 1.

Example 2

As in Example 1, a clear hardcoat layer having a thickness of 4 μm was formed on one surface of a polyethylene terephthalate film having a thickness of 188 μm (OFW, Teijin DuPont Films).

Then, as in Example 1, the coating solution A was coated on the surface opposite from the hardcoat layer in a thickness of 2.0 μm, using a bar coat method. After drying at 50° C. for 1 minute, the coating was irradiated with ultraviolet light to form a cured resin layer having irregularities. The film haze after forming the cured resin layer was 2.3%.

Then, using a sputtering method, an $SiO_x$ layer was formed on the cured resin layer having irregularities, using a Si target. The thickness of the $SiO_x$ layer so formed was about 2.0 nm.

Thereafter, as in Example 1, a first transparent conductive layer and a second transparent conductive layer were formed to produce a movable electrode substrate. The environmental reliability properties of the produced transparent conductive multilayer body are presented in Table 1. The crystal grain size as observed with a TEM fell in a range of from 50 nm to 200 nm.

As in Example 1, a fixed electrode substrate was produced. The fixed electrode substrate and the movable electrode substrate produced as above were used to produce a transparent touch panel shown in FIG. 2.

Figure 2:
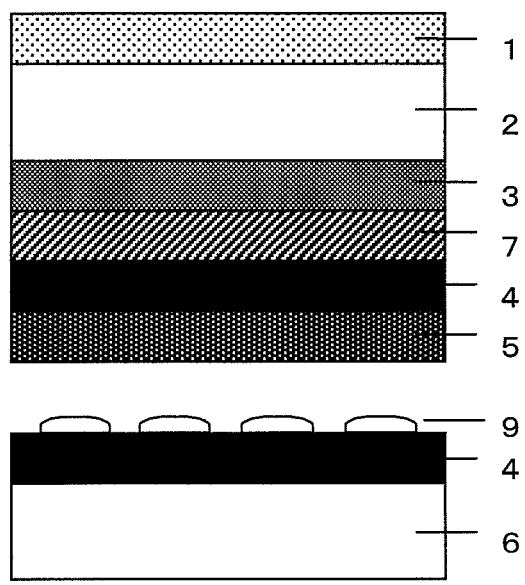
FIG. 2 is a cross sectional view schematically illustrating a configuration of a transparent touch panel obtained according to the procedures of Examples 2 through 6, and Comparative Examples 5 and 6 of the present application.

In FIG. 2, 1 denotes a hardcoat layer, 2 denotes a polymer film, 3 denotes a cured resin layer, 4 denotes a first transparent conductive layer, 5 denotes a second transparent conductive layer, 6 denotes a glass substrate, 7 denotes a metal oxide layer, and 9 denotes dot spacers.

The transparent touch panel so obtained was subjected to a slide durability test and an edge pressure durability test. A change in linearity before and after the test is presented in Table 1.

Example 3

As in Example 2, a clear hardcoat layer having a thickness of 4 μm was formed on one surface of a polyester terephthalate film having a thickness of 188 μm (OFW, Teijin DuPont Films).

Then, as in Example 1, the coating solution A was coated on the surface opposite from the hardcoat layer in a thickness of 2.0 μm, using a bar coat method. After drying at 50° C. for 1 minute, the coating was irradiated with ultraviolet light to form a cured resin layer having irregularities. The film haze after forming the cured resin layer was 2.3%.

Then, using a sputtering method, an $SiO_x$ layer was formed on the cured resin layer having irregularities, using a Si target. The thickness of the $SiO_x$ layer so formed was about 2.0 nm.

Thereafter, a first transparent conductive layer and a second transparent conductive layer were formed to produce a movable electrode substrate as in Example 1, except that the thickness of the first transparent conductive layer was varied from 20 nm to 33 nm. The environmental reliability properties of the produced transparent conductive multilayer body are presented in Table 1. The crystal grain size as observed with a TEM fell in a range of from 50 nm to 200 nm.

As in Example 1, a fixed electrode substrate was produced. The fixed electrode substrate and the movable electrode substrate produced as above were used to produce a transparent touch panel shown in FIG. 2.

In FIG. 2, 1 denotes a hardcoat layer, 2 denotes a polymer film, 3 denotes a cured resin layer, 4 denotes a first transparent conductive layer, 5 denotes a second transparent conductive layer, 6 denotes a glass substrate, 7 denotes a metal oxide layer, and 9 denotes dot spacers.

The transparent touch panel so obtained was subjected to a slide durability test and an edge pressure durability test. A change in linearity before and after the test is presented in Table 1.

Example 4

As in Example 2, a clear hardcoat layer having a thickness of 4 μm was formed on one surface of a polyethylene terephthalate film having a thickness of 188 μm (OFW, Teijin DuPont Films).

Then, as in Example 1, the coating solution A was coated on the surface opposite from the hardcoat layer in a thickness of 2.0 μm, using a bar coat method. After drying at 50° C. for 1 minute, the coating was irradiated with ultraviolet light to form a cured resin layer having irregularities. The film haze after forming the cured resin layer was 2.3%.

Then, using a sputtering method, an $SiO_x$ layer was formed on the cured resin layer having irregularities, using a Si target. The thickness of the $SiO_x$ layer so formed was about 2.0 nm.

Thereafter, as in Example 1, a first transparent conductive layer was formed. A second transparent conductive layer was then formed on the first transparent conductive layer as in Example 1, except that the crystalline ITO nanoparticles used in Example 1 were replaced with amorphous ITO nanoparticles (an average primary particle diameter of 20 nm; C.I. Kasei Co., Ltd.), so as to produce a movable electrode substrate. The environmental reliability properties of the produced transparent conductive multilayer body are presented in Table 2. The crystal grain size as observed with a TEM fell in a range of from 50 nm to 200 nm.

As in Example 1, a fixed electrode substrate was produced. The fixed electrode substrate and the movable electrode substrate produced as above were used to produce a transparent touch panel shown in FIG. 2.

In FIG. 2, 1 denotes a hardcoat layer, 2 denotes a polymer film, 3 denotes a cured resin layer, 4 denotes a first transparent conductive layer, 5 denotes a second transparent conductive layer, 6 denotes a glass substrate, 7 denotes a metal oxide layer, and 9 denotes dot spacers.

The transparent touch panel so obtained was subjected to a slide durability test and an edge pressure durability test. A change in linearity before and after the test is presented in Table 2.

Example 5

As in Example 1, a clear hardcoat layer having a thickness of 4 μm was formed on one surface of a polyethylene terephthalate film having a thickness of 188 μm (OFW, Teijin DuPont Films).

The coating solution C prepared in Reference Example 3 was then coated on the surface opposite from the hardcoat layer in a thickness of 3.5 μm, using a bar coat method. After drying at 50° C. for 1 minute, the coating was irradiated with ultraviolet light to form a cured resin layer. The film haze after forming the cured resin layer was 1.0%.

Then, using a sputtering method, a $SiO_x$ layer was formed on the cured resin layer using a Si target. The thickness of the $SiO_x$ layer so formed was about 2.0 nm.

Then, using a sputtering method, an ITO layer was formed on the $SiO_x$ layer, using an indium oxide-tin oxide target (an indium oxide to tin oxide weight ratio of 97:3; fill density, 98%). The thickness of the ITO layer so formed was about 20 nm, and the surface resistivity after forming the ITO layer was about 550Ω/□ (Ω/sq.).

Thereafter, the coating solution E produced according to the procedure of Reference Example 5 was used to form a second transparent conductive layer as in Example 1, thereby producing a transparent conductive multilayer body that serves as the movable electrode substrate. The movable electrode substrate so produced was subjected to a heat treatment at 150° C. for 60 minutes to crystallize the ITO layer. The surface resistivity after crystallizing the ITO layer was about 370Ω/□ (Ω/sq.). The environmental reliability properties of the produced transparent conductive multilayer body are presented in Table 2. The crystal grain size as observed with a TEM fell in a range of from 50 nm to 200 nm.

Then, a fixed electrode substrate was formed as in Example 1. The fixed electrode substrate and the movable electrode substrate produced as above were used to produce a transparent touch panel shown in FIG. 2.

In FIG. 2, 1 denotes a hardcoat layer, 2 denotes a polymer film, 3 denotes a cured resin layer, 4 denotes a first transparent conductive layer, 5 denotes a second transparent conductive layer, 6 denotes a glass substrate, 7 denotes a metal oxide layer, and 9 denotes dot spacers.

The transparent touch panel so obtained was subjected to a slide durability test and an edge pressure durability test. A change in linearity before and after the test is presented in Table 2.

Example 6

As in Example 1, a clear hardcoat layer having a thickness of 4 μm was formed on one surface of a polyethylene terephthalate film having a thickness of 188 μm (OFW, Teijin DuPont Films).

The coating solution D prepared in Reference Example 4 was then coated on the surface opposite from the hardcoat layer in a thickness of 2.5 μm, using a bar coat method. After drying at 50° C. for 1 minute, the coating was irradiated with ultraviolet light to form a cured resin layer. The film haze after forming the cured resin layer was 0.7%.

Then, using a sputtering method, a $SiO_x$ layer was formed on the cured resin layer using a Si target. The thickness of the $SiO_x$ layer so formed was about 2.0 nm.

Then, using a sputtering method, an ITO layer was formed on the $SiO_x$ layer, using an indium oxide-tin oxide target (an indium oxide to tin oxide weight ratio of 97:3; fill density, 98%). The thickness of the ITO layer so formed was about 20 nm, and the surface resistivity after forming the ITO layer was about 550Ω/□ (Ω/sq.).

Thereafter, the coating solution E produced according to the procedure of Reference Example 5 was used to form a second transparent conductive layer as in Example 1, thereby producing a transparent conductive multilayer body that serves as the movable electrode substrate. The movable electrode substrate so produced was subjected to a heat treatment at 150° C. for 60 minutes to crystallize the ITO layer. The surface resistivity after crystallizing the ITO layer was about 370Ω/□ (Ω/sq.). The environmental reliability properties of the produced transparent conductive multilayer body are presented in Table 2. The crystal grain size as observed with a TEM fell in a range of from 50 nm to 200 nm.

Then, a fixed electrode substrate was formed as in Example 1. The fixed electrode substrate and the movable electrode substrate produced as above were used to produce a transparent touch panel shown in FIG. 2.

In FIG. 2, 1 denotes a hardcoat layer, 2 denotes a polymer film, 3 denotes a cured resin layer, 4 denotes a first transparent conductive layer, 5 denotes a second transparent conductive layer, 6 denotes a glass substrate, 7 denotes a metal oxide layer, and 9 denotes dot spacers.

The transparent touch panel so obtained was subjected to a slide durability test and an edge pressure durability test. A change in linearity before and after the test is presented in Table 2.

TABLE 1

|  |  | Example 1 | Example 2 | Example 3 |
|---|---|---|---|---|
| Edge pressure durability | 2.0 mm from the edge | +0.22% | +0.18% | +0.71% |
|  | 1.5 mm from the edge | +0.65% | +0.32% | +1.380% |
| Slide durability |  | +0.33% 300,000 times | +0.18% 300,000 times | +0.22% 300,000 times |
| Light transmittance/haze of transparent conductive multilayer body |  | 90.2%/2.0% | 89.9%/2.0% | 88.3%/2.1% |
| Evaluation of environmental reliability (high temperature and high humidity reliability) Change in surface resistivity after maintaining at 60° C., 90% RH for 240 hrs. |  | 1.04 | 1.03 | 1.01 |
| Evaluation of environmental reliability (high temperature reliability) Change in surface resistivity after maintaining at 80° C. under dry condition for 240 hrs. |  | 1.09 | 1.08 | 1.02 |

TABLE 2

|  |  | Example 4 | Example 5 | Example 6 |
|---|---|---|---|---|
| Edge pressure durability | 2.0 mm from the edge | +0.20% | +0.11% | +0.09% |
|  | 1.5 mm from the edge | +0.40% | +0.41% | +0.29% |
| Slide durability |  | +0.22% 300,000 times | +0.19% 300,000 times | +0.09% 300,000 times |
| Light transmittance/haze of transparent conductive multilayer body |  | 90.3%/2.1% | 91.3%/1.1% | 91.8%/0.9% |
| Evaluation of environmental reliability (high temperature and high humidity reliability) Change in surface resistivity after maintaining at 60° C., 90% RH for 240 hrs. |  | 1.15 | 1.03 | 1.04 |

TABLE 2-continued

|  | Example 4 | Example 5 | Example 6 |
|---|---|---|---|
| Evaluation of environmental reliability (high temperature reliability) Change in surface resistivity after maintaining at 80° C. under dry condition for 240 hrs. | 1.20 | 1.09 | 1.08 |

Comparative Example 1

A transparent conductive multilayer body was produced as the movable electrode substrate as in Example 1, except that the second transparent conductive layer was not laminated. The environmental reliability properties of the transparent conductive multilayer body so produced are presented in Table 3. The crystal grain size as observed with a TEM fell in a range of from 50 nm to 200 nm.

The fixed electrode substrate was produced as in Example 1. The fixed electrode substrate and the movable electrode substrate so produced were used to produce the transparent touch panel shown in FIG. 3.

Figure 3:
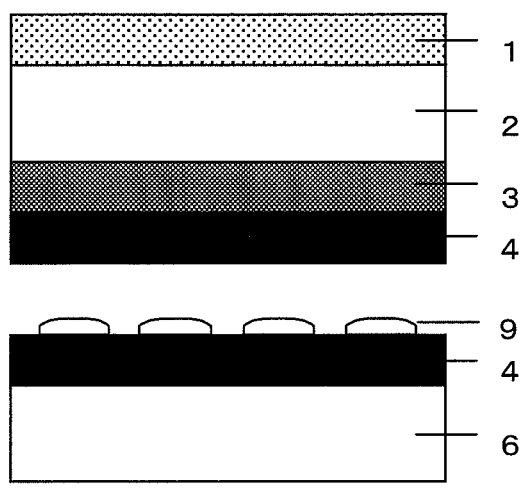
FIG. 3 is a cross sectional view schematically illustrating a configuration of a transparent touch panel obtained according to the procedure of Comparative Example 1 of the present application.

In FIG. 3, 1 denotes a hardcoat layer, 2 denotes a polymer film, 3 denotes a cured resin layer, 4 denotes a first transparent conductive layer, 6 denotes a glass substrate, and 9 denotes dot spacers. The transparent touch panel so obtained was subjected to a slide durability test and an edge pressure durability test. A change in linearity before and after the test is presented in Table 3.

Comparative Example 2

As in Example 1, a hardcoat layer having a thickness of 4 μm was formed on one surface of a polyethylene terephthalate film having a thickness of 188 μm (OFW, Teijin DuPont Films).

Then, a cured resin layer having irregularities was formed on the surface opposite from the hardcoat layer, using the coating solution A prepared in Reference Example 1. A transparent conductive layer was then formed on the cured resin layer so formed using a polythiophene conductive polymer, so that the surface resistivity after forming the transparent conductive layer was about 500Ω/□ (Ω/sq.). As a result, a transparent conductive multilayer body that serves as the movable electrode substrate was produced. The thickness of the transparent conductive layer so formed was about 150 nm. The environmental reliability properties of the transparent conductive multilayer body so produced are presented in Table 3.

Then, a fixed electrode substrate was formed as in Example 1. The fixed electrode substrate and the movable electrode substrate produced as above were used to produce a transparent touch panel shown in FIG. 4.

Figure 4:
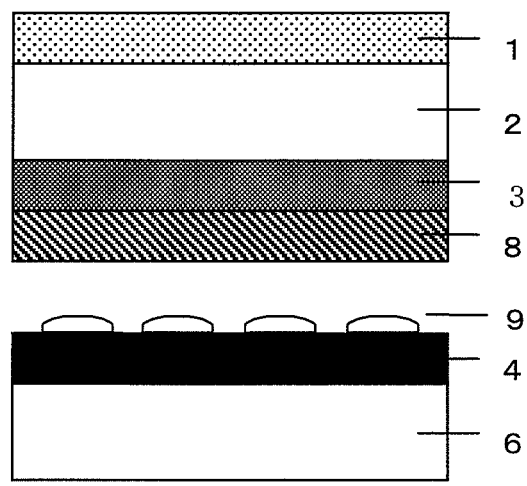
FIG. 4 is a cross sectional view schematically illustrating a configuration of a transparent touch panel obtained according to the procedure of Comparative Example 2 of the present application.

In FIG. 4, 1 denotes a hardcoat layer, 2 denotes a polymer film, 3 denotes a cured resin layer, 4 denotes a first transparent conductive layer, 6 denotes a glass substrate, 8 denotes a conductive polymer layer, and 9 denotes dot spacers. The transparent touch panel so obtained was subjected to a slide durability test and an edge pressure durability test. A change in linearity before and after the test is presented in Table 3.

Comparative Example 3

A transparent conductive multilayer body as the movable electrode substrate was produced as in Example 1, except that a polythiophene conductive polymer was laminated as the second transparent conductive layer. The surface resistivity after laminating the first transparent conductive layer and the second transparent conductive layer was about 310Ω/□ (Ω/sq.). The movable electrode substrate so produced was subjected to a heat treatment at 150° C. for 90 minutes to crystallize the first transparent conductive layer (ITO layer) The surface resistivity after crystallizing the ITO layer was about 240Ω/□ (Ω/sq.). The environmental reliability properties of the transparent conductive multilayer body so produced are presented in Table 3. The crystal grain size as observed with a TEM fell in a range of from 50 nm to 200 nm.

Then, a fixed electrode substrate was formed as in Example 1. The fixed electrode substrate and the movable electrode substrate produced as above were used to produce a transparent touch panel shown in FIG. 1.

In FIG. 1, 1 denotes a hardcoat layer, 2 denotes a polymer film, 3 denotes a cured resin layer, 4 denotes a first transparent conductive layer, 5 denotes a second transparent conductive layer, 6 denotes a glass substrate, and 9 denotes dot spacers.

The transparent touch panel so obtained was subjected to a slide durability test and an edge pressure durability test. A change in linearity before and after the test is presented in Table 3.

TABLE 3

|  |  | Comparative example 1 | Comparative example 2 | Comparative example 3 |
|---|---|---|---|---|
| Edge pressure durability | 2.0 mm from the edge | +3.2% (after 100 strokes) | No vertical conduction | +0.32% |
|  | 1.5 mm from the edge | +5.1% (after 100 strokes) |  | +0.77% |
| Write durability (middle portion) |  | +0.45% |  | +0.48% |
| Light transmittance/haze of transparent conductive multilayer body |  | 87.1%/2.4% | 82.4%/1.9% | 81.8%/1.8% |
| Evaluation of environmental reliability (high temperature and high humidity reliability) Change in surface resistivity after maintaining at 60° C., 90% RH for 240 hrs. |  | 1.05 | 1.85 | 1.28 |

TABLE 3-continued

|  | Comparative example 1 | Comparative example 2 | Comparative example 3 |
|---|---|---|---|
| Evaluation of environmental reliability (high temperature reliability) Change in surface resistivity after maintaining at 80° C. under dry condition for 240 hrs. | 1.01 | 2.27 | 1.40 |

Comparative Examples 4 to 6

A transparent conductive multilayer body as the movable electrode substrate was produced as in Examples 1 to 3, except that an amorphous transparent conductive layer IZO was used as the first transparent conductive layer. The surface resistivity after forming the IZO layer was about 230Ω/□ (Ω/sq.). The thickness was about 20 nm. The surface resistivity after laminating the second transparent conductive layer was about 170Ω/□ (Ω/sq.). The environmental reliability properties of the transparent conductive multilayer body so produced are presented in Table 4. No crystals were observed under a TEM.

The fixed electrode substrate was produced as in Example 1. The fixed electrode substrate and the movable electrode substrate produced as above were used to produce a transparent touch panel of the configuration shown in FIG. 1 (Comparative Example 4) or FIG. 2 (Comparative Examples 5 and 6). In FIG. 1 and FIG. 2, 1 denotes a hardcoat layer, 2 denotes a polymer film, 3 denotes a cured resin layer, 4 denotes a first transparent conductive layer, 5 denotes a second transparent conductive layer, 6 denotes a glass substrate, 7 denotes a metal oxide layer, and 9 denotes dot spacers. The transparent touch panels so obtained were subjected to a slide durability test and an edge pressure durability test. A change in linearity before and after the test is presented in Table 4.

of the film as the transparent conductive multilayer body. Accordingly, no evaluation was made.

Example 7

A transparent conductive multilayer body as the movable electrode substrate was produced as in Example 1, except that the thickness of the second transparent conductive layer was varied to 1.1 μm. The environmental reliability properties of the transparent conductive multilayer body so produced are presented in Table 5.

The fixed electrode substrate was produced as in Example 1. The fixed electrode substrate and the movable electrode substrate so produced were used to produce the transparent touch panel shown in FIG. 1.

In FIG. 1, 1 denotes a hardcoat layer, 2 denotes a polymer film, 3 denotes a cured resin layer, 4 denotes a first transparent conductive layer, 5 denotes a second transparent conductive layer, 6 denotes a glass substrate, and 9 denotes dot spacers.

The transparent touch panel so obtained was subjected to a write durability test and an edge pressure durability test. Linearities before and after the test are presented in Table 5.

TABLE 4

|  |  | Comparative example 4 | Comparative example 5 | Comparative example 6 |
|---|---|---|---|---|
| Edge pressure durability | 2.0 mm from the edge | +1.9% (after 20,000 times) | +2.4% (after 20,000 times) | +2.0% (after 20,000 times) |
|  | 1.5 mm from the edge | +3.3% (after 20,000 times) | +2.9% (after 20,000 times) | +5.1% (after 20,000 times) |
| Write durability (middle portion) |  | +2.2% (after 20,000 times) | +1.8% (after 20,000 times) | +3.2% (after 20,000 times) |
| Light transmittance/haze of transparent conductive multilayer body |  | 90.1%/2.1% | 89.9%/2.0% | 90.8%/1.0% |
| Evaluation of environmental reliability (high temperature and high humidity reliability) Change in surface resistivity after maintaining at 60° C., 90% RH for 240 hrs. |  | 1.31 | 1.29 | 1.28 |
| Evaluation of environmental reliability (high temperature reliability) Change in surface resistivity after maintaining at 80° C. under dry condition for 240 hrs. |  | 1.37 | 1.40 | 1.36 |

Comparative Examples 7 to 9

A transparent conductive multilayer body as the movable electrode substrate was produced as in Examples 1 to 3, except that the cured resin layer was not laminated. In all of the transparent conductive multilayer bodies, the oligomer component separated out from the polyethylene terephthalate film after the heat treatment performed to crystallize the ITO layer, and the film turned white. This prevented the use

TABLE 5

|  |  | Example 7 |
|---|---|---|
| Edge pressure durability | 2.0 mm from the edge | 0.48% |
|  | 1.5 mm from the edge | 0.71% |
| Write durability (middle portion) |  | 0.69% |
| Light transmittance/haze of transparent conductive multilayer body |  | 89.5%/1.3% |
| Evaluation of environmental reliability (high temperature and high humidity reliability) |  | 1.41 |

TABLE 5-continued

| | Example 7 |
|---|---|
| Change in surface resistivity after maintaining at 60° C., 90% RH for 240 hrs. Evaluation of environmental reliability (high temperature reliability) Change in surface resistivity after maintaining at 80° C. under dry condition for 240 hrs. | 1.39 |

As is clear from the foregoing results, a transparent conductive multilayer body of the present invention excels in edge pressure durability, transparency, and environmental reliability. In contrast, the transparent conductive multilayer body of Comparative Example 1 had poor edge pressure durability. The transparent conductive multilayer body of Comparative Example 2 failed to operate as a transparent touch panel because of the failed vertical conduction. The transparent conductive multilayer body of Comparative Example 3 had poor transparency.

Example 8

The coating solution F produced according to the procedure of Reference Example 6 was coated on the both surfaces of a polyethylene terephthalate (PET) film having a thickness of 188 μm (OFW, Teijin DuPont Films), using a bar coat method. After drying at 70° C. for 1 minute, the coating was cured by irradiation of ultraviolet light, and a cured resin layer having a thickness of 3.5 μm was formed.

Then, using a sputtering method, a first transparent conductive layer (ITO layer) was formed on one of the cured resin layers, using an indium oxide-tin oxide target (an indium oxide to tin oxide weight ratio of 95:5; fill density, 98%). The ITO layer had a thickness of about 20 nm, and a surface resistivity of about 350Ω/☐ (Ω/sq.).

Further, the coating solution B produced according to the procedure of Reference Example 2 was coated on the first transparent conductive layer using a bar coat method. The coating was baked at 130° C. for 2 minutes to form a second transparent conductive layer having a thickness of about 200 nm.

The surface resistivity of the transparent conductive layer with the first transparent conductive layer and the second transparent conductive layer was about 270Ω/☐ (Ω/sq.). Thereafter, a heat treatment was performed at 150° C. for 90 minutes to crystallize the first transparent conductive layer (ITO layer) and form a transparent conductive multilayer body that serves as the movable electrode substrate. The surface resistivity of the transparent conductive layer with the first transparent conductive layer and the second transparent conductive layer after crystallizing the ITO layer was about 210Ω/☐ (Ω/sq.). The crystal grain size of the first transparent conductive layer as observed with a TEM fell in a range of from 50 nm to 200 nm. The properties of the transparent conductive multilayer body so produced are presented in Table 6.

As in Example 1, a fixed electrode substrate was produced. The fixed electrode substrate and the movable electrode substrate produced as above were used to produce a transparent touch panel shown in FIG. 5.

Figure 5:
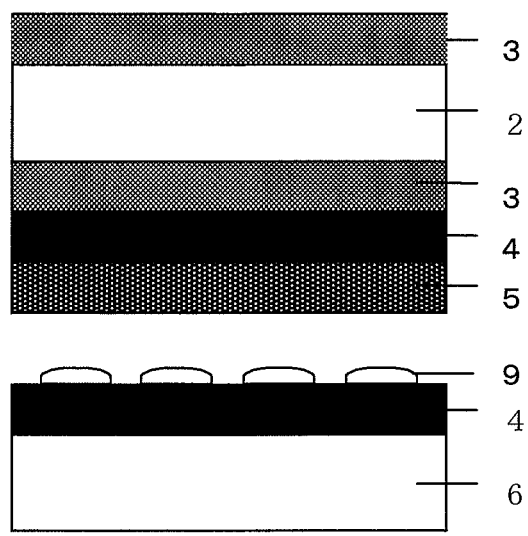
FIG. 5 is a cross sectional view schematically illustrating a configuration of a transparent touch panel obtained according to the procedures of Example 8 and Comparative Example 10 of the present application.

In FIG. 5, 2 denotes a polymer film, 3 denotes a cured resin layer, 4 denotes a first transparent conductive layer, 5 denotes a second transparent conductive layer, 6 denotes a glass substrate, and 9 denotes dot spacers.

The properties of the touch panel so produced are presented in Table 6. As is clear from Table 6, the touch panel using the transparent conductive multilayer body of this example excels in anti-glare property, anti-Newton's ring property, flicker, slide durability, edge pressure durability B, and fingerprint wipability.

Comparative Example 10

As in Example 8, a cured resin layer having a thickness of 3.5 μm was formed on the both surfaces of a polyethylene terephthalate film having a thickness of 188 μm (OFW, Teijin DuPont Films).

Then, using a sputtering method, an amorphous first transparent conductive layer (ITO layer) was formed on one of the cured resin layers, using an indium oxide-tin oxide target (an indium oxide to tin oxide weight ratio of 95:5; fill density, 98%). The ITO layer had a thickness of about 20 nm, and a surface resistivity of about 350Ω/☐ (Ω/sq.).

Further, as in Example 8, a second transparent conductive layer having a thickness of about 200 nm was formed on the first transparent conductive layer to produce a transparent conductive multilayer body that serves as the movable electrode substrate. The surface resistivity of the transparent conductive layer with the first transparent conductive layer and the second transparent conductive layer was about 270Ω/☐ (Ω/sq.). The properties of the transparent conductive multilayer body so produced are presented in Table 6.

A fixed electrode substrate was produced as in Example 1. The fixed electrode substrate and the movable electrode substrate produced as above were used to produce a transparent touch panel shown in FIG. 5.

In FIG. 5, 2 denotes a polymer film, 3 denotes a cured resin layer, 4 denotes a first transparent conductive layer, 5 denotes a second transparent conductive layer, 6 denotes a glass substrate, and 9 denotes dot spacers.

The properties of the touch panel so produced are presented in Table 6. As is clear from Table 6, the touch panel using the transparent conductive multilayer body of this example in which the amorphous ITO layer was used for the first transparent conductive layer has poor slide durability and poor edge pressure durability B.

Comparative Example 11

As in Example 8, a cured resin layer having a thickness of 3.5 μm was formed on the both surfaces of a polyethylene terephthalate film having a thickness of 188 μm (OFW, Teijin DuPont Films). Then, as in Example 8, a second transparent conductive layer having a thickness of about 200 nm was directly formed on one of the cured resin layers to produce a transparent conductive multilayer body. The transparent conductive multilayer body so obtained had no conductivity, and did not function as a transparent conductive multilayer body.

Comparative Example 12

As in Example 8, a cured resin layer having a thickness of 3.5 μm was formed on the both surfaces of a polyethylene terephthalate film having a thickness of 188 μm (OFW, Teijin DuPont Films).

Then, as in Example 1, a first transparent conductive layer (ITO layer) was formed on one of the cured resin layers. The ITO layer had a thickness of about 20 nm, and a surface resistivity of about 350Ω/☐ (Ω/sq.). This was followed by a heat treatment at 150° C. for 90 minutes to crystallize the first transparent conductive layer (ITO layer) and produce a transparent conductive multilayer body that serves as the movable electrode substrate.

The surface resistivity of the first transparent conductive layer after crystallizing the ITO layer was about 260Ω/☐ (Ω/sq.). The properties of the transparent conductive multilayer body are presented in Table 6.

A fixed electrode substrate was produced as in Example 1. The fixed electrode substrate and the movable electrode substrate produced as above were used to produce a transparent touch panel shown in FIG. 6.

Figure 6:
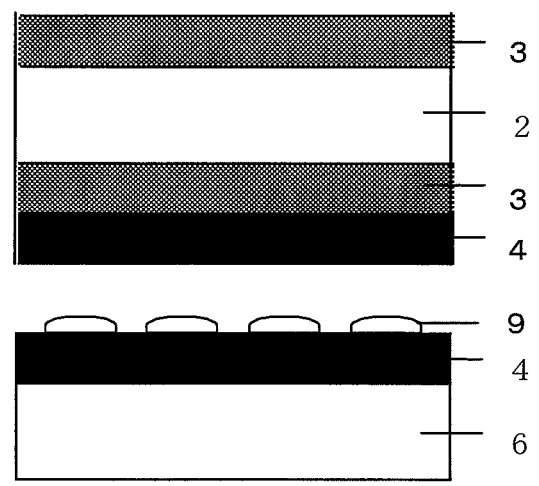
FIG. 6 is a cross sectional view schematically illustrating a configuration of a transparent touch panel obtained according to the procedure of Comparative Example 12 of the present application.

In FIG. 6, 2 denotes a polymer film, 3 denotes a cured resin layer, 4 denotes a first transparent conductive layer, 6 denotes a glass substrate, and 9 denotes dot spacers.

The properties of the touch panel so produced are presented in Table 6. As is clear from Table 6, the touch panel of this example not laminating the second transparent conductive layer has poor slide durability and poor edge pressure durability B.

TABLE 6

|  |  | Example 8 | Com. Ex. 10 | Com. Ex. 11 | Com. Ex. 12 |
|---|---|---|---|---|---|
| Cured resin layer | Thickness (μm) | 3.5 | 3.5 | 3.5 | 3.5 |
|  | Contact angle of water (°) | 77 | 77 | 77 | 77 |
|  | Surface roughness Ra (nm) on the transparent conductive layer side | 125 | 125 | 130 | 135 |
|  | Surface roughness Rz (μm) on the transparent conductive layer side | 0.7 | 0.75 | 0.7 | 0.75 |
| First transparent conductive layer |  | Crystalline | Amorphous | Absent | Crystalline |
| Second transparent conductive layer |  | Present | Present | Present | Absent |
| Transparent conductive multilayer body Touch panel | Haze (%) | 9.2 | 8.9 | 9.0 | 10.1 |
|  | Light transmittance (%) | 90.3 | 89.9 | 90.1 | 86.7 |
|  | Anti-glare property | Desirable | Desirable | Desirable | Desirable |
|  | Anti-Newton's ring property | Desirable | Desirable |  | Desirable |
|  | Flicker | Desirable | Desirable |  | Desirable |
|  | Slide durability | No problem through 300,000 times (+0.05%) | Problem after 100,000 times (+1.8%) |  | No problem through 300,000 times (+0.35%) |
|  | Edge pressure durability B | No problem through 100,000 times (+0.09%) | Problem after 30,000 times (+2.2%) |  | Problem after 10,000 times (+3.61%) |
|  | Fingerprint wipability | Desirable | Desirable | — | Desirable |

The invention claimed is:

1. A transparent conductive multilayer body, comprising a cured resin layer, a first transparent conductive layer, and a second transparent conductive layer sequentially laminated on at least one surface of a polymer film,
characterized in that:
the first transparent conductive layer is a crystalline transparent conductive layer free of an organic component; and
the second transparent conductive layer contains alkoxysilane, and at least one kind of fine particles A formed of crystalline ITO fine particles having an average primary particle diameter of 100 nm or less;
wherein the transparent conductive multilayer body further comprises a silicon oxide layer between the cured resin layer and the first transparent conductive layer,
wherein the silicon oxide layer has a thickness at least 0.5 nm and less than 5.0 nm,
wherein the content of the fine particles A is at least 0.1 parts by weight and at most 400 parts by weight with respect to 100 parts by weight of the alkoxysilane,
wherein the cured resin layer is formed from a curable resin which consists of an ionizing radiation curable resin or a heat curable resin,
wherein each crystalline ITO fine particle of the crystalline ITO fine particles has a crystal phase of at least 50%,
wherein the cured resin layer has surface irregularities formed by phase separation of two kinds of component, and is free of fine particles that impart irregularities,
wherein the cured resin layer has an arithmetic mean roughness (Ra) of at least 0.05 μm and less than 0.5 μm as measured according to JIS B0601-1994, and a ten-point mean roughness (Rz) of at least 0.5 μm and less than 2 μm as measured according to JIS B0601-1982, and
wherein the transparent conductive multilayer body further comprises an optical interference layer between the polymer film and the first transparent conductive layer, wherein the optical interference layer is formed of a low-refractive-index layer of at least a single layer, and a high-refractive-index layer of at least a single layer, and wherein the low-refractive-index layer is in contact with the first transparent conductive layer.

2. The transparent conductive multilayer body according to claim 1, wherein the cured resin layer is formed of a polymer as a first component, and a monomer as a second component.

3. The transparent conductive multilayer body according to claim 1, wherein the first component and the second component forming the cured resin layer have a Solubility Parameter value difference of 0.5 or more.

4. The transparent conductive multilayer body according to claim 1, wherein the first component forming the cured resin layer is an unsaturated double bond-containing acryl copolymer, and the second component is a multifunctional unsaturated double bond-containing monomer.

5. The transparent conductive multilayer body according to claim 1, wherein the transparent conductive multilayer body has a haze of 1% or more and less than 20% as measured according to JIS K 7136.

6. A transparent conductive multilayer body, comprising a cured resin layer, a first transparent conductive layer, and a second transparent conductive layer sequentially laminated on at least one surface of a polymer film,
characterized in that:
the first transparent conductive layer is a crystalline transparent conductive layer free of an organic component; and
the second transparent conductive layer contains alkoxysilane, and at least one kind of fine particles A formed of crystalline ITO fine particles having an average primary particle diameter of 100 nm or less;
wherein the transparent conductive multilayer body further comprises a silicon oxide layer between the cured resin layer and the first transparent conductive layer,
wherein the silicon oxide layer has a thickness at least 0.5 nm and less than 5.0 nm,
wherein the content of the fine particles A is at least 0.1 parts by weight and at most 400 parts by weight with respect to 100 parts by weight of the alkoxysilane,
wherein the cured resin layer is formed from a curable resin which consists of an ionizing radiation curable resin or a heat curable resin,
wherein each crystalline ITO fine particle of the crystalline ITO fine particles has a crystal phase of at least 50%,
wherein (i) that the second transparent conductive layer has a thickness of at least 100 nm and at most 1,500 nm and (ii) that the second transparent conductive layer contains fine particles B of an average primary particle diameter greater than the thickness of the second transparent conductive layer by a factor of at least 1.2, and
wherein the transparent conductive multilayer body further comprises an optical interference layer between the polymer film and the first transparent conductive layer, wherein the optical interference layer is formed of a low-refractive-index layer of at least a single layer, and a high-refractive-index layer of at least a single layer, and wherein the low-refractive-index layer is in contact with the first transparent conductive layer.

* * * * *